United States Patent
Dinh et al.

(10) Patent No.: US 11,613,819 B2
(45) Date of Patent: Mar. 28, 2023

(54) CATALYSTS WITH SHARP REACTION INTERFACE FOR ELECTROCHEMICAL CO2 REDUCTION WITH ENHANCED SELECTIVITY

(71) Applicant: THE GOVERNING COUNCIL OF THE UNIVERSITY OF TORONTO, Toronto (CA)

(72) Inventors: Cao-Thang Dinh, Toronto (CA); Thomas Burdyny, Toronto (CA); Md Golam Kibria, Toronto (CA); Ali Seifitokaldani, Toronto (CA); David Sinton, Toronto (CA); Edward Sargent, Toronto (CA)

(*) Notice: Subject to any disclaimer, the term of this patent is extended or adjusted under 35 U.S.C. 154(b) by 444 days.

(21) Appl. No.: 16/625,218

(22) PCT Filed: Jun. 21, 2018

(86) PCT No.: PCT/CA2018/050758
§ 371 (c)(1),
(2) Date: Dec. 20, 2019

(87) PCT Pub. No.: WO2018/232515
PCT Pub. Date: Dec. 27, 2018

(65) Prior Publication Data
US 2020/0141015 A1    May 7, 2020

Related U.S. Application Data

(60) Provisional application No. 62/522,925, filed on Jun. 21, 2017.

(51) Int. Cl.
*C25B 11/051* (2021.01)
*C10G 2/00* (2006.01)
(Continued)

(52) U.S. Cl.
CPC .......... *C25B 11/051* (2021.01); *C10G 2/50* (2013.01); *C25B 3/25* (2021.01); *C25B 3/29* (2021.01);
(Continued)

(58) Field of Classification Search
None
See application file for complete search history.

(56) References Cited

U.S. PATENT DOCUMENTS

2013/0228470 A1    9/2013   Chen

OTHER PUBLICATIONS

Kutz, R.B.; Chen, Q.; Yang, H.; Sajjad, S.D.; Liu, Z.; Masel, I.R. Sustainion Imidazolium-Functionalized Polymers for Carbon Dioxide Electrolysis. Energy Technol. 2017, 5, 929-936.
(Continued)

*Primary Examiner* — Wojciech Haske
(74) *Attorney, Agent, or Firm* — Mackenzie D. Rodriguez; Stone Pigman Walther Wittmann L.L.C.

(57) ABSTRACT

An abrupt interface electroreduction catalyst includes a porous gas diffusion layer and a catalyst layer providing a sharp reaction interface. The electroreduction catalyst can be used for converting $CO_2$ into a target product such as ethylene. The porous gas diffusion layer can be hydrophobic and configured for contacting gas-phase $CO_2$ while the catalyst layer is disposed on and covers a reaction interface side of the porous gas diffusion layer. The catalyst layer has another side contacting an electrolyte and can be hydrophilic, composed a metal such as Cu and is sufficiently thin to prevent diffusion limitations of the reactant in the electrolyte and enhance selectivity for the target product. The electroreduction catalyst can be made by vapor deposition methods and can be used for electrochemical production of ethylene in reaction system.

20 Claims, 22 Drawing Sheets

(51) Int. Cl.
    C25B 11/031    (2021.01)
    C25B 3/25      (2021.01)
    C25B 3/29      (2021.01)
    C25B 11/075    (2021.01)
    C25B 11/081    (2021.01)
(52) U.S. Cl.
    CPC .......... *C25B 11/031* (2021.01); *C25B 11/075* (2021.01); *C25B 11/081* (2021.01); *C10G 2300/4043* (2013.01); *C10G 2400/20* (2013.01); *C10G 2400/22* (2013.01)

(56) References Cited

OTHER PUBLICATIONS

Sebastian, D.; Palella, A.; Baglio, V.; Spadaro, L.; Siracusano, S.; Negro, P.; Niccoli, F.; Arícó, A.S. CO2 reduction to alcohols in a polymer electrolyte membrane co-electrolysis cell operating at low potentials. Electrochim. Acta 2017, 241, 28-40.
Marepally, B.C.; Ampelli, C.; Genovese, C.; Saboo, T.; Perathoner, S.; Wisser, F.M.; Veyre, L.; Canivet, J.; Quadrelli, E.A.; Centi, G. Enhanced formation of >C1 Products in Electroreduction of CO2 by Adding a CO2 Adsorption Component to a Gas-Diffusion Layer-Type Catalytic Electrode. ChemSusChem 2017, 10, 4442-4446.
Ma, L.; Fan, S.; Zhen, D.; Wu, X.; Liu, S.; Lin, J.; Huang, S.; Chen, W.; He, G. Electrochemical Reduction of CO2 in Proton Exchange Membrane Reactor: The Function of Buffer Layer. Ind. Eng. Chem. Res. 2017, 56, 10242-10250.
Lee, S.; Ju, H.; Machunda, R.; Uhm, S.; Lee, J.K.; Lee, H.J.; Lee, J. Sustainable production of formic acid by electrolytic reduction of gaseous carbon dioxide. J. Mater. Chem. A 2015, 3, 3029-3034.
Delacourt, C.; Ridgway, P.L.; Kerr, J.B.; Newman, J. Design of an Electrochemical Cell Making Syngas ( CO + H2 ) from CO2 and H2O Reduction at Room Temperature. J. Electrochem. Soc. 2008, 155, B42-B49.
Li, Y.C.; Zhou, D.; Yan, Z.; Gonçalves, R.H.; Salvatore, D.A.; Berlinguette, C.P.; Mallouk, T.E. Electrolysis of CO2 to Syngas in Bipolar Membrane-Based Electrochemical Cells. ACS Energy Lett. 2016, 1, 1149-1153.
Rhee, Y.-W.; Ha, S.Y.; Masel, R.I. Crossover of formic acid through Nafion® membranes. J. Power Source 2003, 117, 35-38.
Albo, Jonathan, and Angel Irabien. "Cu2O-loaded gas diffusion electrodes for the continuous electrochemical reduction of CO2 to methanol." Journal of Catalysis 343 (2016): 232-239.
Del Castillo, A., et al. "Sn nanoparticles on gas diffusion electrodes: Synthesis, characterization and use for continuous CO2 electroreduction to formate." Joural of CO2 Utilization 18 (2017): 222-228.
Merino-Garcia, Ivan, Jonathan Albo, and Angel Irabien. "Productivity and selectivity of gas-phase CO2 electroreduction to methane at copper nanoparticle-based electrodes." Energy Technology 5.6 (2017): 922-928.
Irtem, Erdem, et al. "A photoelectrochemical flow cell design for the efficient CO2 conversion to fuels." Electrochimica Acta 240 (2017): 225-230.
Verma, Sumit, et al. "Insights into the low overpotential electroreduction of CO2 to CO on a supported gold catalyst in an alkaline flow electrolyzer." ACS Energy Letters 3.1 (2017): 193-198.
Jhong, Huei-Ru Molly, et al. "A nitrogen-doped carbon catalyst for electrochemical CO2 conversion to CO with high selectivity and current density." ChemSusChem 10.6 (2017): 1094-1099.
Kim, Byoungsu, et al. "Effects of composition of the micro porous layer and the substrate on performance in the electrochemical reduction of CO2 to CO." Journal of Power Sources 312 (2016): 192-198.
Verma, Sumit, et al. "The effect of electrolyte composition on the electroreduction of CO 2 to CO on Ag based gas diffusion electrodes." Physical Chemistry Chemical Physics 18.10 (2016): 7075-7084.

Liu, M. et al. Enhanced electrocatalytic CO2 reduction via field-induced reagent concentration. Nature 537, 382-386 (2016).
Roberts, F. S., Kuhl, K. P. & Nilsson, A. High Selectivity for Ethylene from Carbon Dioxide Reduction over Copper Nanocube Electrocatalysts. Angew. Chem. Int. Ed. 54, 5179-5182 (2015).
Ren, D. et al. Selective Electrochemical Reduction of Carbon Dioxide to Ethylene and Ethanol on Copper(I) Oxide Catalysts. ACS Cata/. 5, 2814-2821 (2015).
Chen, Y., Li, C. W. & Kanan, M. W. Aqueous CO2 Reduction at Very Low Overpotential on Oxide-Derived Au Nanoparticles. J. Am. Chem. Soc. 134, 19969-19972 (2012).
Wu, J. et al. Achieving Highly Efficient, Selective, and Stable CO2 Reduction on Nitrogen-Doped Carbon Nanotubes. ACS Nano 9, 5364-5371 (2015).
Thorson, M. R., Siil, K. I. & Kenis, P. J. A. Effect of Cations on the Electrochemical Conversion of CO2 to CO. J. Electrochem. Soc. 160, F69-F74 (2013).
Kas, R., Kortlever, R., Yilmaz, H., Koper, M. T. M. & Mui, G. Manipulating the Hydrocarbon Selectivity of Copper Nanoparticles in CO2 Electroreduction by Process Conditions. ChemE/ectroChem 2, 354-358 (2015).
Reller, C. et al. Selective Electroreduction of CO2 toward Ethylene on Nano Dendritic Copper Catalysts at High Current Density. Adv. Energy Mater. n/a-n/a (2017). doi:10.1002/aenm.201602114.
Mistry, H. et al. Highly selective plasma-activated copper catalysts for carbon dioxide reduction to ethylene. Nat. Common. 7, 12123 (2016).
Xiao, H., Cheng, T., Goddard, W. A. & Sundararaman, R. Mechanistic Explanation of the pH Dependence and Onset Potentials for Hydrocarbon Products from Electrochemical Reduction of CO on Cu (111). J. Am. Chem. Soc. 138, 483-486 (2016).
Ma, S. et al. One-step electrosynthesis of ethylene and ethanol from CO2 in an alkaline electrolyzer. J. Power Sources 301, 219-228 (2016).
Li, C. W., Ciston, J. & Kanan, M. W. Electroreduction of carbon monoxide to liquid fuel on oxide-derived nanocrystalline copper. Nature 508, 504-507 (2014).
Stamenkovic, V. R., Strmcnik, D., Lopes, P. P. & Markovic, N. M. Energy and fuels from electrochemical interfaces. Nat. Mater. 16, 57-69 (2017).
Subbaraman, R. et al. Enhancing Hydrogen Evolution Activity in Water Splitting by Tailoring U+—Ni(OH)2—Pt Interfaces. Science 334, 1256-1260 (2011).
Roberts, F. S., Kuhl, K. P. & Nilsson, A. Electroreduction of Carbon Monoxide Over a Copper Nanocube Catalyst: Surface Structure and pH Dependence on Selectivity. ChemCatChem 8, 1119-1124 (2016).
Kortlever, R., Shen, J., Schouten, K. J. P., Calle-Vallejo, F. & Koper, M. T. M. Catalysts and Reaction Pathways for the Electrochemical Reduction of Carbon Dioxide. J. Phys. Chem. Lett. 6, 4073-4082 (2015).
Kresse, G. & Furthmuller, J. Efficient iterative schemes for ab initio total-energy calculations using a plane-wave basis set. Phys. rev. B 54, 11169 (1996).
Kresse, G. & Joubert, D. From ultrasoft pseudopotentials to the projector augmented-wave method. Phys. Rev. B 59, 1758 (1999).
Blochl, P. E. Projector augmented-wave method. Phys. rev. B 50, 17953 (1994).
Perdew, J. P., Burke, K. & Ernzerhof, M. Generalized gradient approximation made simple. Phys. rev. Jett. 77, 3865 (1996).
Tang, W., Sanville, E. & Henkelman, G. A grid-based Bader analysts algorithm without lattice bias. Phys.: Condens. Matter. 21, 084204 (2009).
Singh, M. R., Clark, E. L. & Bell, A. T. Effects of electrolyte, catalyst, and membrane composition and operating conditions on the performance of solar-driven electrochemical reduction of carbon dioxide. Phys. Chem. Chem. Phys. 17, 18924-18936 (2015).
Burdyny, T. et al. Nanomorphology-enhanced gas-evolution intensifies CO2 reduction electrochemistry. ACS Sustainable Chem. Eng. 5, 4031-4040 (2017).
Weisenberger, S. & Schumpe, d. A. Estimation of gas solubilities in salt solutions at temperatures from 273 K to 363 K. A/ChE Journal 42, 298-300 (1996).

(56) References Cited

OTHER PUBLICATIONS

Mistry, H. et al. Highly selective plasma-activated copper catalysts for carbon dioxide reduction to ethylene. Nat. Common. 7, 12123 (2016). (Ref 9 in Table 1).

Gao, D. et al. Plasma-activated copper nanocube catalysts for efficient carbon dioxide electroreduction to hydrocarbons and alcohols. ACS nano 11, 4825-4831 (2017). (Ref 10 in Table 1).

Wu, J. et al. A metal-free electrocatalyst for carbon dioxide reduction to multi-carbon hydrocarbons and oxygenates. Nat Commun. 7, 13869 (2016). (Ref 11 in Table 1).

Hoang, T. T., Ma, S., Gold, J. I., Kenis, P. J. & Gewirth, A. A. Nanoporous copper films by additive-controlled electrodeposition: CO2 reduction catalysis. ACS Catal. 7, 3313-3321 (2017). (Ref 12 in Table 1).

Reller, C. et al. Selective electroreduction of CO2 toward ethylene on nano dendritic copper catalysts at high current density. Adv. Energy Mater. 7, 1602114 (2017). (Ref 13 in Table 1).

Ma, S. et al. One-step electrosynthesis of ethylene and ethanal from CO2 in an alkaline electrolyzer. J. Power Sources 301, 219-228 (2016). (Ref 14 in Table 1).

International Search Report and Written Opinion, PCT/CA2018/050758, dated Aug. 31, 2018.

US 11,613,819 B2

CATALYSTS WITH SHARP REACTION INTERFACE FOR ELECTROCHEMICAL CO2 REDUCTION WITH ENHANCED SELECTIVITY

TECHNICAL FIELD

The technical field generally relates to electrocatalytic methods to convert a chemical precursor to a chemical product, such as electrochemical reduction of for $CO_2$ to produce multi-carbon products.

BACKGROUND

The efficient electrochemical conversion of carbon dioxide ($CO_2$) into valuable carbon-based fuels and compounds is desirable and technology that enhances such conversion can, for example, enable the storage of intermittent renewable electricity as well as net reductions of greenhouse gas emissions.

There is a need for improved techniques and catalysts for efficient electrochemical reduction of reactants such as $CO_2$, and related methods and systems of producing chemical compounds.

SUMMARY

An abrupt reaction interface electroreduction catalyst that includes a porous gas diffusion layer in contact with $CO_2$ gas and a catalyst layer disposed on the gas diffusion layer and in contact with an electrolyte, can facilitate enhanced selectivity for the production of multi-carbon compounds by electroreduction. In some implementations, the gas diffusion layer is composed of a carbon based material, the catalyst layer is composed of Cu and has a thickness between 10 nm and 100 nm, the electrolyte is a relatively high concentration potassium hydroxide solution, and the electroreduction conditions are provided for converting the $CO_2$ into ethylene with enhanced selectivity. Alternatively, other catalyst materials, diffusion layer materials, gas reactants, and operating conditions can be used to provide an abrupt reaction interface to produce other target products with enhanced selectivity. Various optional aspects, implementations, and features of the catalysts including their manufacture and use, are described in further detail herein.

DETAILED DESCRIPTION

Figure 1:
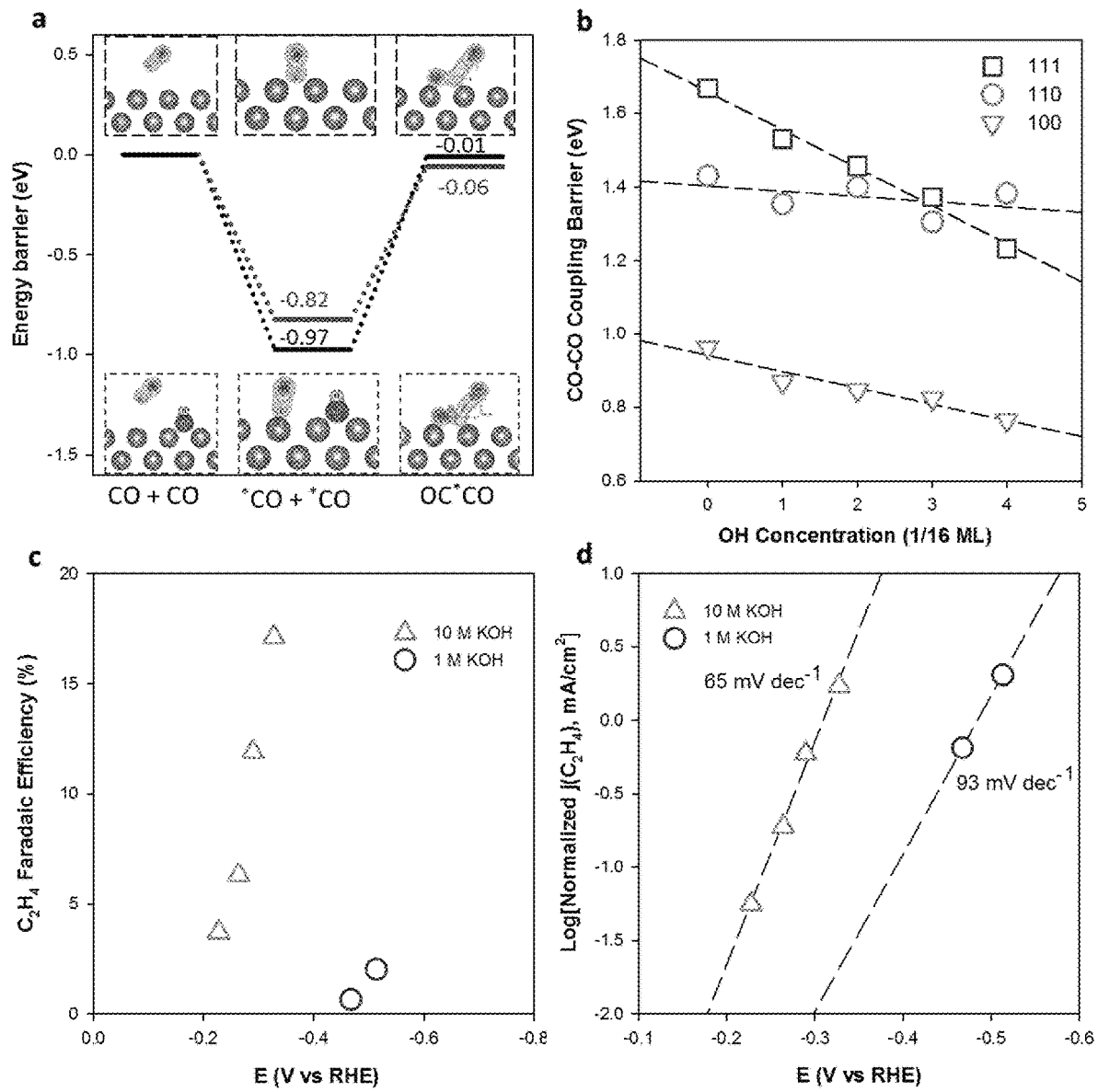
FIG. 1. Computational and experimental studies of the effect of hydroxide on CO—CO coupling. (a) Density Functional Theory (DFT) results for CO binding energy and CO—CO coupling on Cu (100) surface with and without the presence of OH. (b) DFT results showing the reduction of CO—CO coupling barrier on Cu (111), (110) and (100) surfaces in the presence of OH. Ethylene Faradaic Efficiency (c) and partial current densities (d) analyzed at low current density showing the reduction of Ethylene onset potential and Tafel slope with increasing KOH concentration.

Techniques described herein relate to enhanced catalysts and methods that can be used for electrochemical $CO_2$ reduction and the production of multi-carbon compounds. In some implementations, $CO_2$ is converted into a target multi-carbon product, such as ethylene, using an abrupt interface $CO_2$ reduction catalyst, which includes a porous gas diffusion layer and a thin catalyst layer disposed on the gas diffusion layer to enhance selectivity for producing the target multi-carbon product and mitigating $CO_2$ diffusion limitations of the system. In other implementations, a reactant is electrochemically reduced to a target product using an abrupt interface reduction catalyst to mitigate diffusion limitations of the reactant while providing high selectivity for the target product. Methods disclosed herein are particularly advantageous when the reactant has high diffusion limitations and the material would normally result multiple reaction by-products and/or low selectivity for the target product. Methods disclosed herein utilize net electrical energy to produce a product having a higher energetic value than the chemical precursor. In an example embodiment, the approach includes converting $CO_2$ into multi-carbon products.

It has been found that an abrupt or sharp reaction interface can facilitate selective electroreduction of $CO_2$ to multi-carbon products (e.g., ethylene) and the electroreduction can be at low overpotential in alkaline media, for example. In some implementations, an abrupt interface $CO_2$ reduction catalyst includes a catalyst layer and a porous gas diffusion layer. The catalyst layer can be composed of one or more metals, such as copper, and the porous gas diffusion layer can be composed of carbon, e.g., a microporous carbon gas diffusion electrode. The catalyst metal can be selected based on the reactant and target product for a given reaction system. The catalyst layer can be deposited directly onto the gas diffusion layer to form a thin layer with a thickness below 100 nm, for example. The thin catalyst layer can be provided to facilitate high concentrations of reactant (e.g., $CO_2$) and electrolyte components to be present at the same place between the catalyst layer and the gas diffusion layer. The catalyst layer can be thin enough so that the $CO_2$ diffusion length does not substantially inhibit efficient conversion, while being sufficiently thick to provide complete coverage of the surface of the gas diffusion layer.

In some implementations, the gas diffusion layer can be composed of a microporous carbon-based material. The gas diffusion layer can have a roughness of approximately 2 micrometers, although various other roughness properties can be used with the sharp interface catalyst. Roughness can have an impact on optimal current densities, due to variations in surface area for example. The gas diffusion layer can have various properties, compositions and structures in combination with the thin catalyst layer.

Various compositions and structures of the catalytic electrode can be used, and may be provided based on the reactant, target product, operating parameters of the electroreduction process, and so on. Such catalysts can be deployed in a $CO_2$ electroreduction system to convert $CO_2$ into multi-carbon compounds, e.g., using a Cu based catalyst layer to convert $CO_2$ into ethylene. In this case, one side of the catalyst layer is in contact with the electrolyte while the opposed side of the gas diffusion layer is in contact with the $CO_2$-containing gas. When other reactants are used (e.g., CO), the catalyst material can be modified for the desired conversion. For gases with low solubilities in the electrolyte, the abrupt interface can provide greater improvements by mitigating the negative impact of diffusion limitations. It is also noted that the composition of the gas diffusion layer and the electrolyte can also be provided based on the reactant and target product. The electrolyte can be aqueous (e.g., alkaline including a strong base) or could be organic for some applications.

Various aspects and implementations of the catalysts and associated methods of use and manufacture will be described in further detail below.

The efficient electrochemical conversion of carbon dioxide ($CO_2$) into valuable carbon-based fuels provides an avenue for the necessary storage of intermittent renewable electricity sources and reduction of greenhouse gas emissions. A global community has worked to advance the prospects of producing ethylene, a highly demanded feedstock, from the electroreduction of carbon dioxide but key performance metrics, such as selectivity and reaction rate, have only been demonstrated separately. Moreover, these key metrics are only achieved at high overpotentials due to poor carbon coupling kinetics.

The present study demonstrates that alkaline media accelerates the kinetics of $CO_2$ reduction to ethylene and reports that a sharp reaction interface is an advantageous catalyst design principle for efficient ethylene production in alkaline media. Controlling the sharp reaction interface using a sub-100 nm layer of Cu catalyst on a carbon gas diffusion electrode, and a high potassium hydroxide concentration (10 M) as electrolyte, the study achieved an ethylene Faradaic efficiency of 67% at a current density of 275 mA/cm$^2$ and a potential of −0.55 V vs a Reversible Hydrogen Electrode (RHE). The sharp reaction interface facilitates optimizing the reaction environment to achieve an Ethylene Faradaic efficiency of 66% (with a total multiple carbon product total of 82%) at a current density as high as 750 mA/cm$^2$ which enhances efficiency of the conversion of carbon dioxide to multiple carbon products.

The $CO_2$ reduction reaction ($CO_2$RR) has reached lower activation overpotentials and increased Faradaic efficiencies of various $CO_2$ reduction products by tuning catalyst nanomorphology, manipulating oxidation states, introducing dopants and varying system parameters. Specifically for $CO_2$ to ethylene, a highly desirable precursor for polymer production, Cu-oxide derived catalysts have produced ethylene at Faradaic efficiencies of 60% by utilizing a pH-dependent shift in the onset potential of methane and operating in a narrow reaction window. Oxide-derived catalysts, while suppressing methane, have been limited to partial ethylene current densities of under 30 mA cm$^{-2}$ with over 30% of the applied current going towards the primary competing reaction: hydrogen evolution. Separately, ethylene partial currents of over 150 mA cm$^{-2}$ have been achieved at modest selectivities of 36% and at a potential of −0.58 V vs RHE on bare Cu nanoparticles in a flow cell configuration using alkaline electrolytes. The reduced proton environment limits the competing methane and hydrogen evolution reactions to less than 10%, but an additional 20% of the reaction current is diverted to C1 products. Elevated operating pressures have additionally reached ethylene selectivities of up to 43% and partial currents of 35 mA cm$^{-2}$ emphasizing the importance of local $CO_2$ concentrations and CO surface coverage on the CO—CO coupling reaction. The lowest onset potential reported for ethylene production is −0.3 V vs RHE but comes from CO reduction rather than $CO_2$ reduction, removing the primary activation barrier required to convert $CO_2$ to CO. Despite the advancement of individual performance metrics, research has struggled to significantly improve ethylene selectivity, partial current density and energy efficiency in parallel. Discernable leaps in understanding and performance are thus required to advance $CO_2$ electrolyzers from a far-future technology to a carbon-offsetting commercial industry. The present study pursues new insights into the influence of hydroxide on CO—CO coupling and a novel interpretation of catalyst-system interactions to advance the production rate and Faradaic efficiency of $CO_2$ electroreduction conversion to ethylene at low overpotentials.

Hydroxide ions (OH$^-$) (in both adsorbed and bulk forms) plays an important role in electrocatalytic processes such as hydrogen evolution and hydrogen reduction by interacting with reaction intermediates and altering reaction pathways. In $CO_2$RR, alkaline electrolytes are reported to suppress both methane and hydrogen evolution due to reduced proton availability. It was hypothesized that the local reaction environment, specifically the prevalence of hydroxide ions, further influences CO adsorption and C—C coupling steps that directly reduces the energy barrier of ethylene formation on copper (Cu). To investigate this hypothesis the present study used Density Functional Theory (DFT) to assess the impact of hydroxide ions on the individual energy barriers for CO adsorption on Cu (111), (100) and (110) surfaces (see additional information below for DFT summary).

Figure 6:
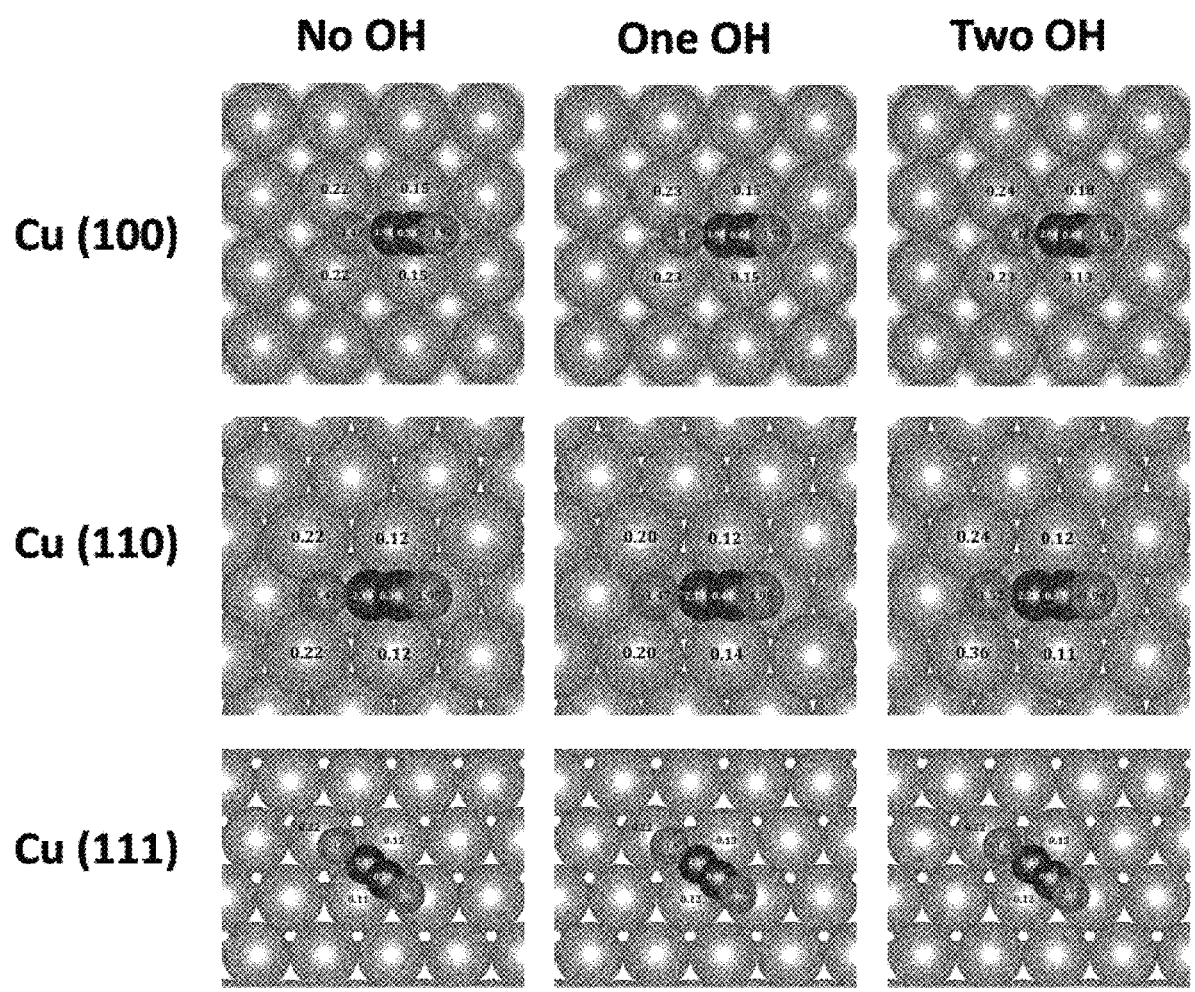
FIG. 6. Effect of OH on adsorbed OCCO intermediate. Oxidation states (charge density) of the adsorbed OCCO elements and the adjacent copper as calculated by Bader charge analysis. Oxidation states on (100), (110) and (111) facets of copper, without OH, with one and two OH are shown for the most stable configurations.
Figure 7:
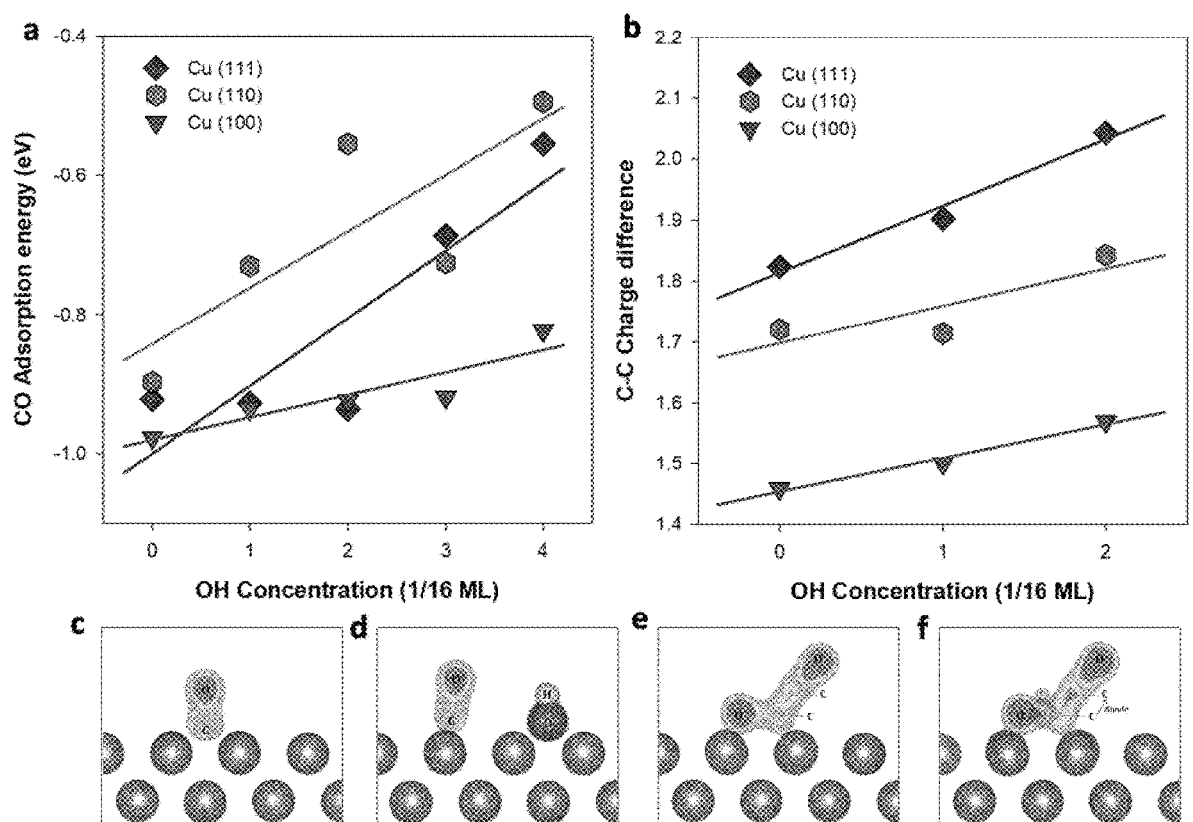
FIG. 7. Effect of OH on CO binding energy and C—C charge difference. (a) CO adsorption energy on (100), (110) and (111) facets of copper at different OH concentrations. (b) Charge differences of two carbons in adsorbed OCCO on three different facets of copper and at different OH concentrations. (c, d) Electron charge density and the optimized configuration of the adsorbed CO with no OH and one OH on Cu(100). (e, f) Electron charge density and the optimized configuration of the adsorbed OCCO with no OH and one OH on Cu(100). The charge difference between two carbons and the induced dipole in presence of OH is shown in (f).

The results, as shown in FIG. 1a and FIG. 7, reveal that the presence of hydroxide lowers the binding energy of CO on all three Cu surfaces. As surface adsorbed CO is a key intermediate in $CO_2$RR to multiple carbon products, changing the CO binding energy alters the overall reaction kinetics. Next, the study investigates the effect of hydroxide on CO—CO coupling, the rate limiting step in $CO_2$RR to multiple carbon products. The presence of hydroxide is found to lower the C—C coupling energy barrier by as much as 117 meV on Cu (100), the primary active surface, with OH concentrations as low as 2/16 ML (FIGS. 1a and 1b). The energy barrier is further reduced as the OH concentration is increased as well as by positioning the hydroxide ion closer to the adsorbed CO (FIG. 1b). In addition, hydroxide increases the charge imbalance between carbon atoms in adsorbed OCCO, which further stabilizes this intermediate by making stronger dipole attraction within OCCO, and then further stabilizes this intermediate by making a stronger dipole attraction within OCCO (see additional information below and FIGS. 6 and 7). The same behavior is seen on the other two surfaces, which further confirms the critical role of hydroxide in lowering the reaction barrier for multiple carbon products from $CO_2$RR.

To assess the DFT predictions that hydroxide aids in CO—CO coupling on a copper surface, the study assessed the kinetics of $CO_2$RR in a flow cell configuration under various bulk KOH electrolyte concentrations. The Cu catalyst was thermally deposited onto the carbon microporous surface of a gas diffusion layer which allows for a stable gaseous $CO_2$-liquid electrolyte interface to form adjacent to the Cu catalyst and for hydroxide and $CO_2$ to exist concurrently. As the bulk KOH concentration was shifted from 1 M to 10 M the onset potential for ethylene was reduced from −0.48 V vs RHE to as low as −0.18 V vs RHE at 10 M (FIG. 1c), only 0.26 V higher than the potential thermodynamically necessary to accomplish $CO_2$-to-ethylene electroreduction. Remarkably, this is the lowest onset for ethylene formation from $CO_2$RR reported (Table 1). Further increasing the KOH concentration to 15M did not significantly reduce the ethylene onset potential (Table 4). The CO—CO coupling reaction potential on the bare Cu sample in 10 M KOH electrolyte then occurs at much lower potentials than that of Nilsson et al. in an H-cell configuration (−0.6 V vs RHE). Interestingly, the onset potential shift of 260 mV when the KOH concentration increases from 1M to 10M is much higher than the potential shift due to pH difference (150 mV, see additional information below for further details, including Table 4), emphasizing the critical role of hydroxide in reducing the CO—CO coupling barrier as predicted by DFT.

Tafel analysis (FIG. 1d) of the Cu catalyst in 1 and 10 M KOH gives a slope of 93 and 65 mV dec$^{-1}$. The reduced slope in 10 M KOH further confirms faster CO—CO coupling kinetics in higher hydroxide concentration, in good agreement with the DFT predictions in FIGS. 1a and b. Note that the Tafel slope of 65 mV is even smaller than that of CO—CO coupling in CO reduction (110 mV, Kanan et al.). The study then concludes that elevated hydroxide concentrations at the surface of the catalyst substantially decrease the reaction barrier of CO—CO coupling reaction.

With the important role of hydroxide in CO—CO coupling, the study aimed to design a catalyst capable of $CO_2$ reduction in concentrated KOH electrolyte where $CO_2$ availability is adversely affected due to acid-base neutralization and 'salting out' effects. Additionally, during product formation hydroxide generated at the electrode's surface will further inhibit local $CO_2$ concentrations and subsequently the surface coverage of CO necessary for CO—CO coupling. For these reasons $CO_2RR$ in alkaline media can occur at meaningful current densities in a flow cell reactor where $CO_2$ diffuses to the catalyst across a gas-liquid interface established by depositing a hydrophilic catalyst on top of a hydrophobic gas diffusion layer (FIG. 2a).

Figure 8:
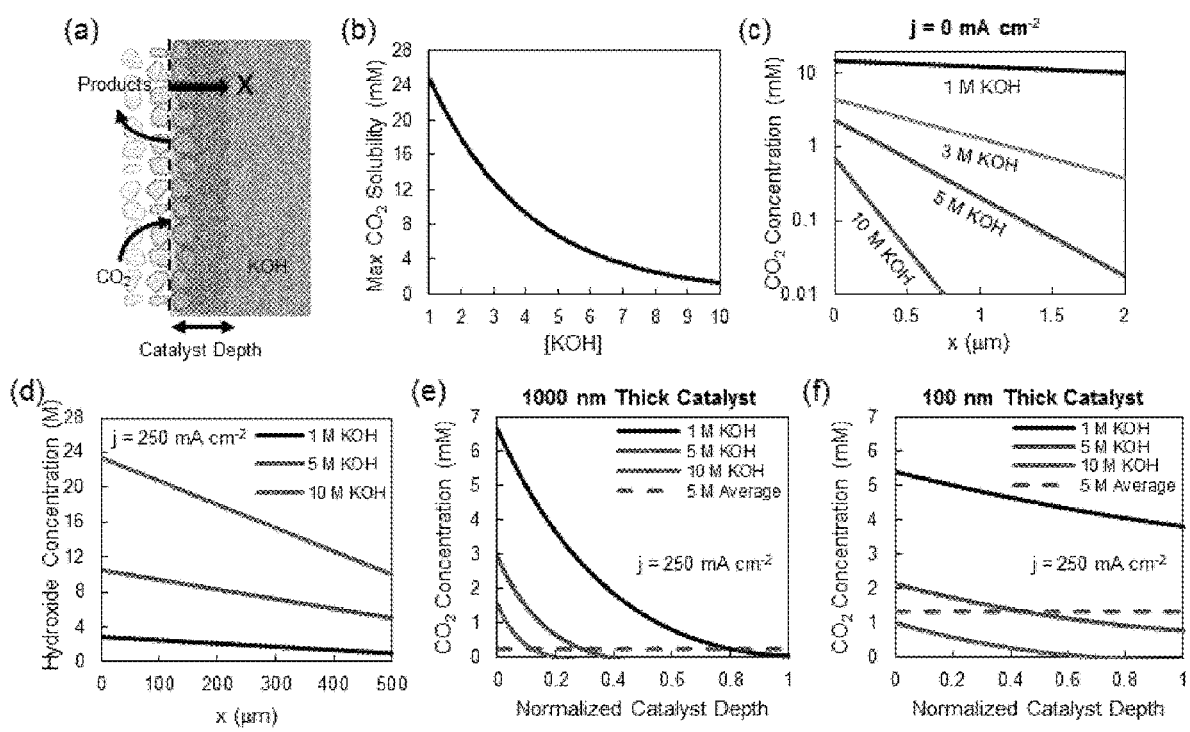
FIG. 8. Modeling of the gas-liquid diffusion interface. (a) Schematic of the modeled gas-liquid interface where $CO_2$ reduction occurs on the red catalyst. (b) Maximum $CO_2$ solubility in various bulk KOH concentrations due to 'salting out' effects. (c) $CO_2$ diffusion into various KOH concentrations without catalyst or $CO_2$ reduction (j=0 mA $cm^{-2}$). (d) OH distribution in the liquid diffusion layer at a current of 250 mA $cm^{-2}$, (e) $CO_2$ distribution throughout a 1000 nm thick catalyst layer at a current of 250 mA $cm^{-2}$, (f) $CO_2$ distribution throughout a 100 nm thick catalyst layer at a current of 250 mA $cm^{-2}$. Model assumes a selectivity distribution of 10% $H_2$, 10% CO and 80% C2 products, catalyst porosity of 60% and liquid diffusion thickness of 500 μm.

The local $CO_2$ concentration within the catalyst layer is then modeled as a function of electrolyte concentration, catalyst thickness and current density (FIG. 8). Of particular interest is the calculated difference in $CO_2$ concentration and distribution for a thin (100 nm) and thick (1 μm) catalyst layer (FIG. 2b). For the thinner catalyst the average $CO_2$ concentration across the catalyst in a 5 M electrolyte operating at 250 mA cm$^{-2}$ is 5.4-times higher than that of the thicker catalyst due to reduced electrolyte interactions. As KOH is increased to 10 M the thick catalyst layer becomes $CO_2$ depleted at the applied current density. A thin catalyst, which forms a sharp reaction interface rather than a more distributed one, is then more preferable for use as a catalyst when trying to obtain higher maximum current densities and a simultaneously high surface concentration of $CO_2$ and $OH^-$. Furthermore, the predicted local $OH^-$ concentration deviates from the bulk at low current densities due to neutralization with $CO_2$ and at high currents due to hydroxide generation (FIG. 2c), placing further emphasis on the necessity of a sharp reaction interface to maintain ample $CO_2$ at the reaction surface.

Figure 3:
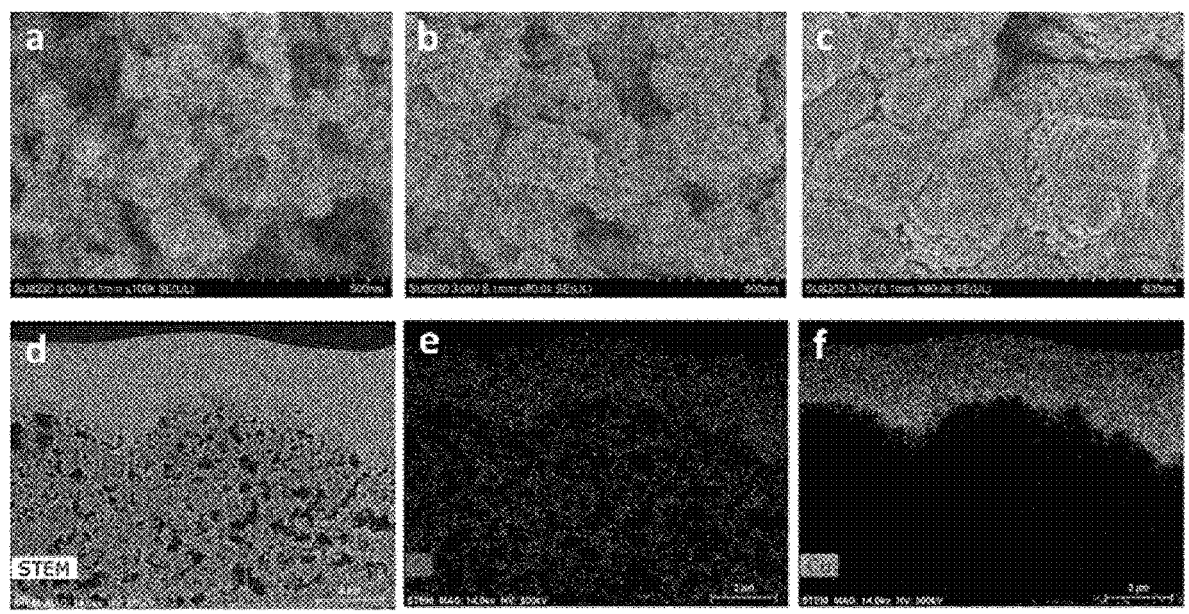
FIG. 3. Physical characterization of evaporated Cu catalyst on porous gas diffusion electrodes. SEM images of the sample with different thickness: a, EV1; b, EV2; and c, EV3. d, Cross-section STEM of a EV2. The fill region show the roughness of the reaction interface where Cu is deposited. Elemental mapping for C (e) and Cu (f) on the cross-section mode of EV2.
Figure 9:
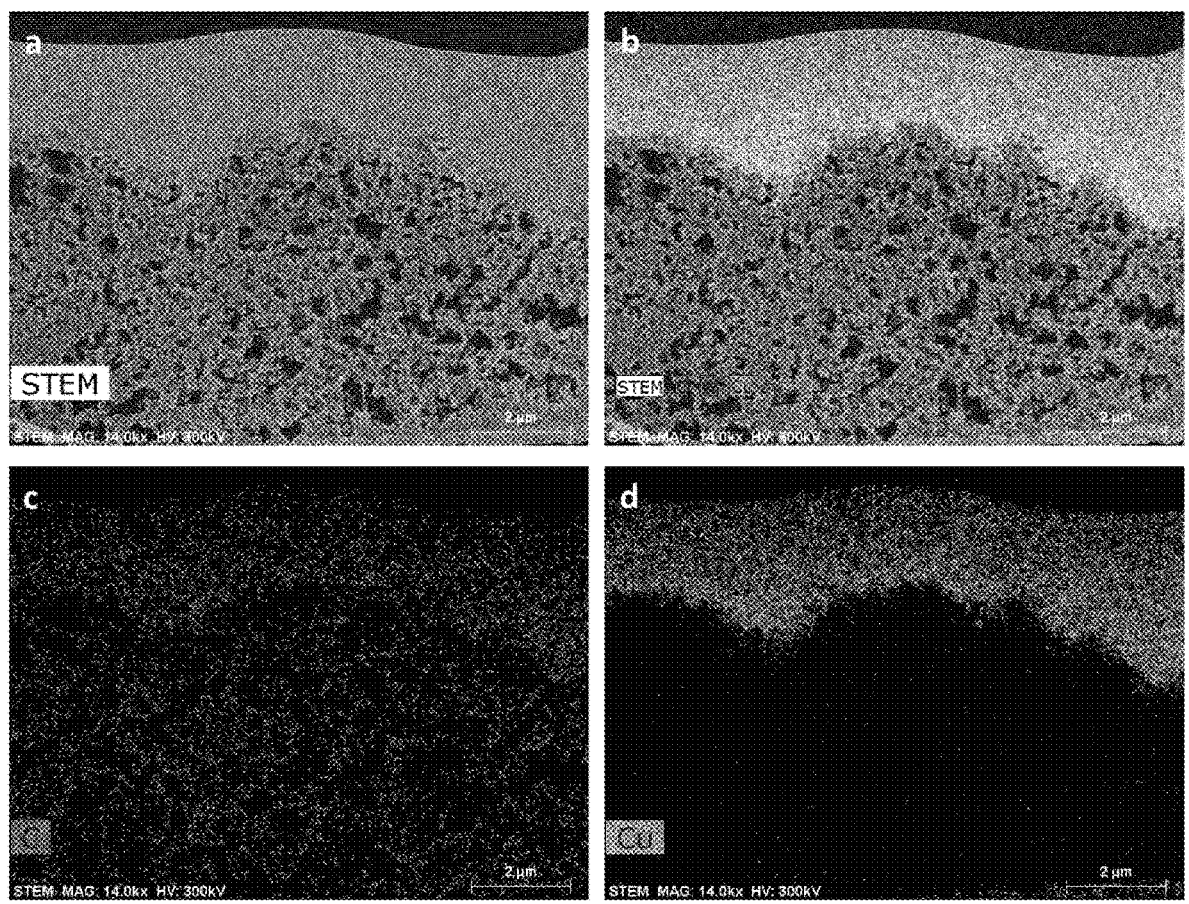
FIG. 9. Cross-section characterization of Al2 electrode. Structural and compositional analysis technique using a focused ion beam (FIB) system and scanning transmission electron microscope (STEM). (a) Cross-section STEM of sample Al2. The fill region shows the roughness of the reaction interface where Cu is deposited. Elemental mapping for Carbon (c) and Cu (d) and overlap of all elements (b) on the cross-section mode of AI2. W was used to protect the surface during sample preparation using FIB.

To drive $CO_2$ reduction to ethylene towards high efficiency, current density and selectivity the study sought to implement the reaction conditions and sharp reaction interface as proposed in two previous simulations. Using thermal evaporation of Cu onto a commercially available gas-diffusion layer, the study created homogenous electrodes with deposition thicknesses of 10, 25 and 1000 nm (denoted as EV1, EV2 and EV3) by controlling evaporation rate and time. The nanoparticle size and surface morphologies were characterized by Scanning Electron Microscopy (SEM) (FIG. 3a-c). The particle sizes are in the range of 15 to 40 nm. The cross section of the deposited catalyst layer was examined via focused ion beam and scanning electron microscope (FIG. 9). FIG. 3d-e show the cross-section STEM images and elemental mapping of 25 nm thickness Cu deposited on the gas diffusion layer (EV2 sample) using FIB-TEM technique. The roughness of the electrode is estimated to be around 2 micrometer with Cu uniformly deposited on the surface of the microporous carbon layer.

Figure 10:
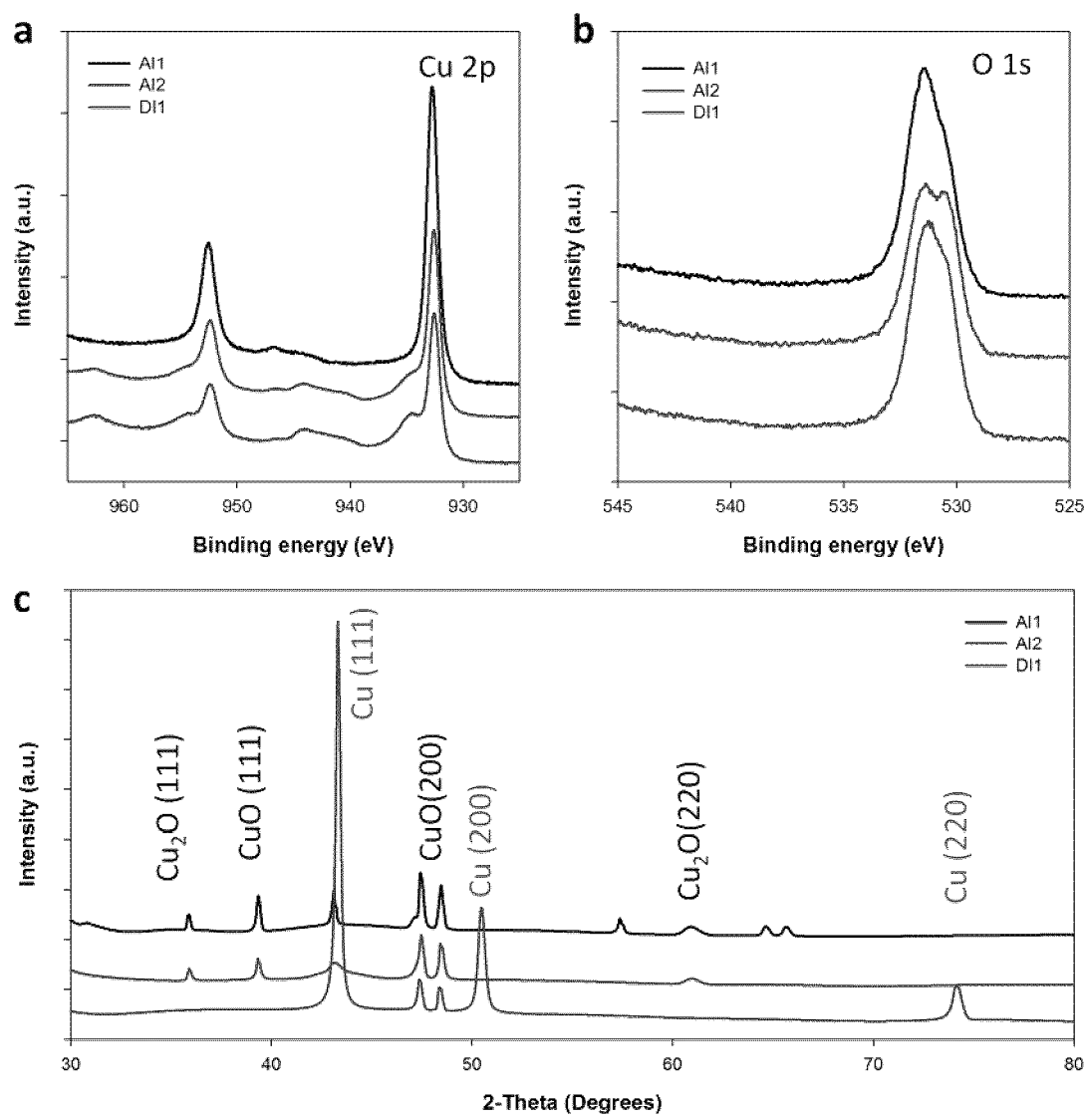
FIG. 10. Chemical and physical characterization of Cu catalysts. (a) Cu 2p and (b) O 1s XPS spectra of the samples showing the presence of metallic and oxide phases on the surface of all AI1, AI2 and DI1 samples. (c) XRD diffraction patterns of AI1, AI2 and DI1 samples showing the co-existence of both oxide and metallic phases.

X-ray photoelectron spectroscopy of all three samples showed the presence of C, Cu, and O (FIGS. 10a and 10b). The Cu peaks indicated a mixture of metallic Cu and $Cu^{1+}$. X-ray diffraction further confirmed the crystalline structure of the samples (FIG. 10c). All samples show diffraction peaks of metallic Cu phase (2-Theta of 43, 50, 75 degree) while only a small amount of oxide phase appeared in the three samples. The catalyst loadings, analyzed using ICP-MS technique, were ~11, 28 and 1100 μg/cm$^2$ for EV1, EV2 and EV3, respectively.

Figure 4:
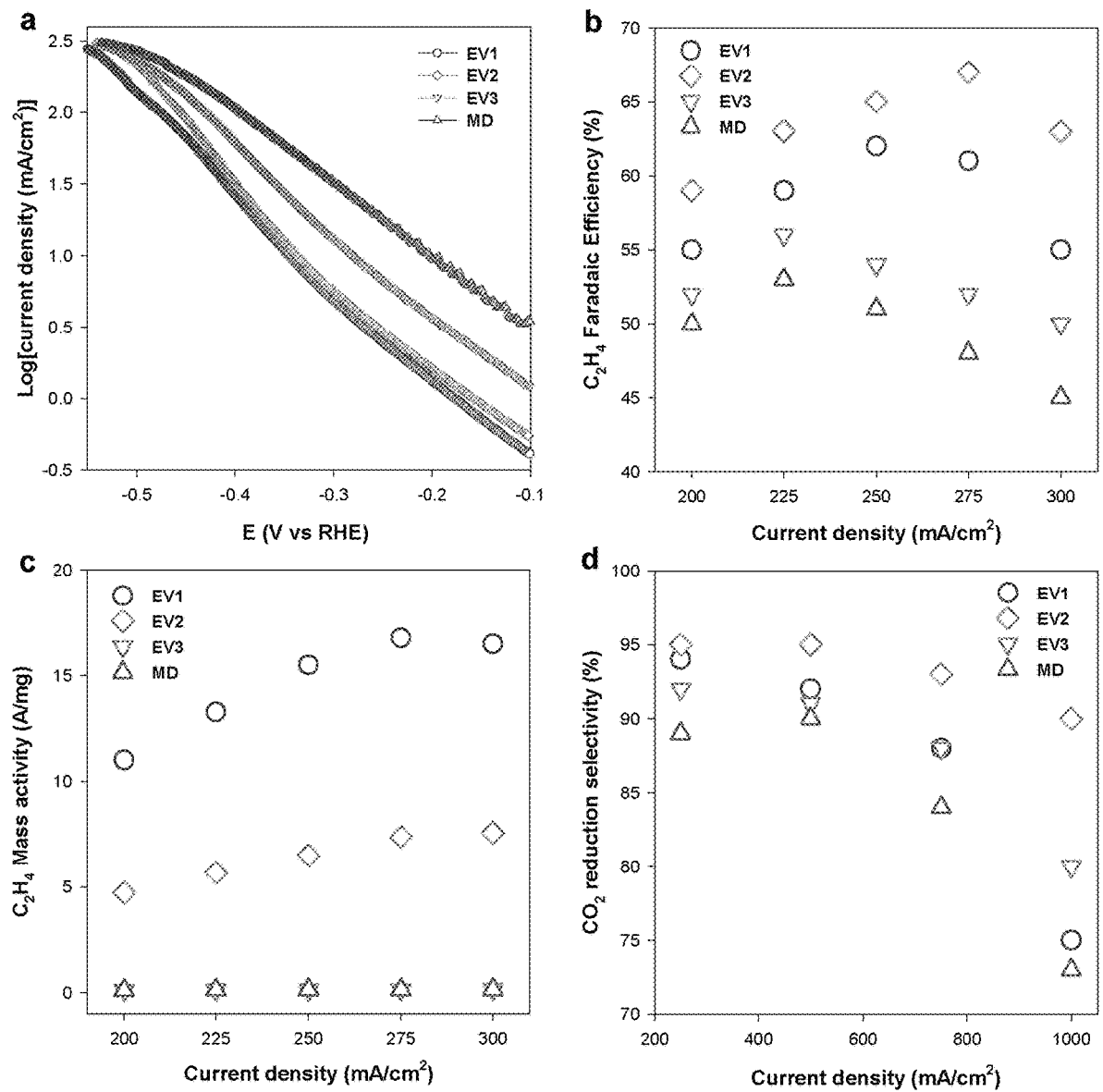
FIG. 4. $CO_2$RR performance on evaporated Cu in alkaline flow cell configuration. (a) Linear Scanning Voltammetry curves under $CO_2$RR conditions using 10 M KOH electrolyte on evaporated and mechanical deposition Cu samples. (b) Ethylene Faradaic Efficiencies in the current density range of 200-300 mA/$cm^2$ showing the superior ethylene selectivity of sharp reaction interface samples (EV1 and EV2) compared to extended reaction interface sample (EV3 and MD). (c) Ethylene mass activity analysis showing exceptionally high mass activity of sharp reaction interface samples. (d) $CO_2$RR activity in 1 M KOH electrolyte showing high $CO_2$RR selectivity of optimal sample (EV) at high current density.
Figure 11:
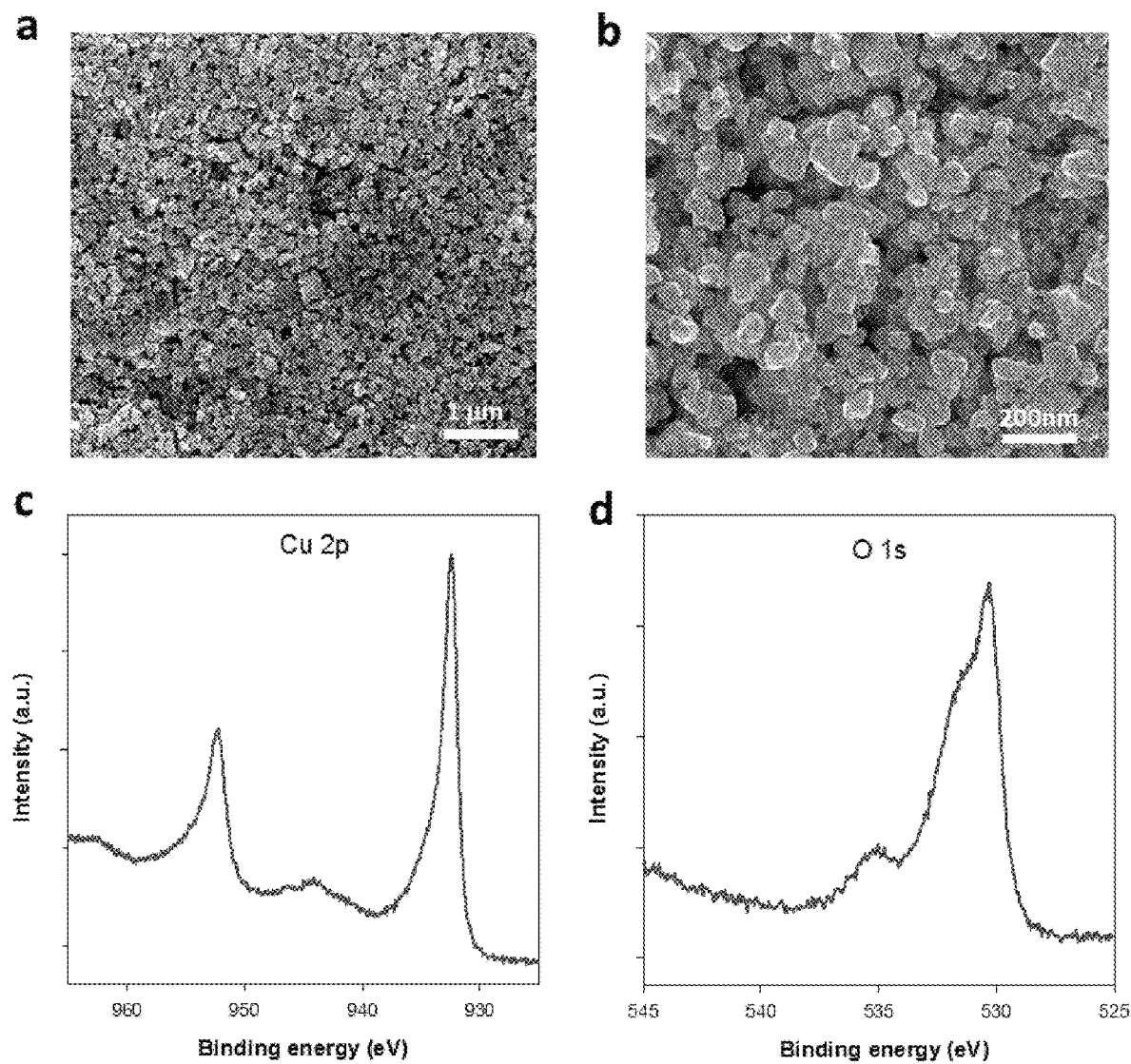
FIG. 11. Characterization of DI2 catalysts. (a, b) SEM images showing the size of Cu nanoparticles used in the DI2 sample (around 50 nm). (c) Cu 2p and (d) O 1s XPS spectra of the sample showing the presence of oxide phase on the surface of Cu nanoparticle.
Figure 12:
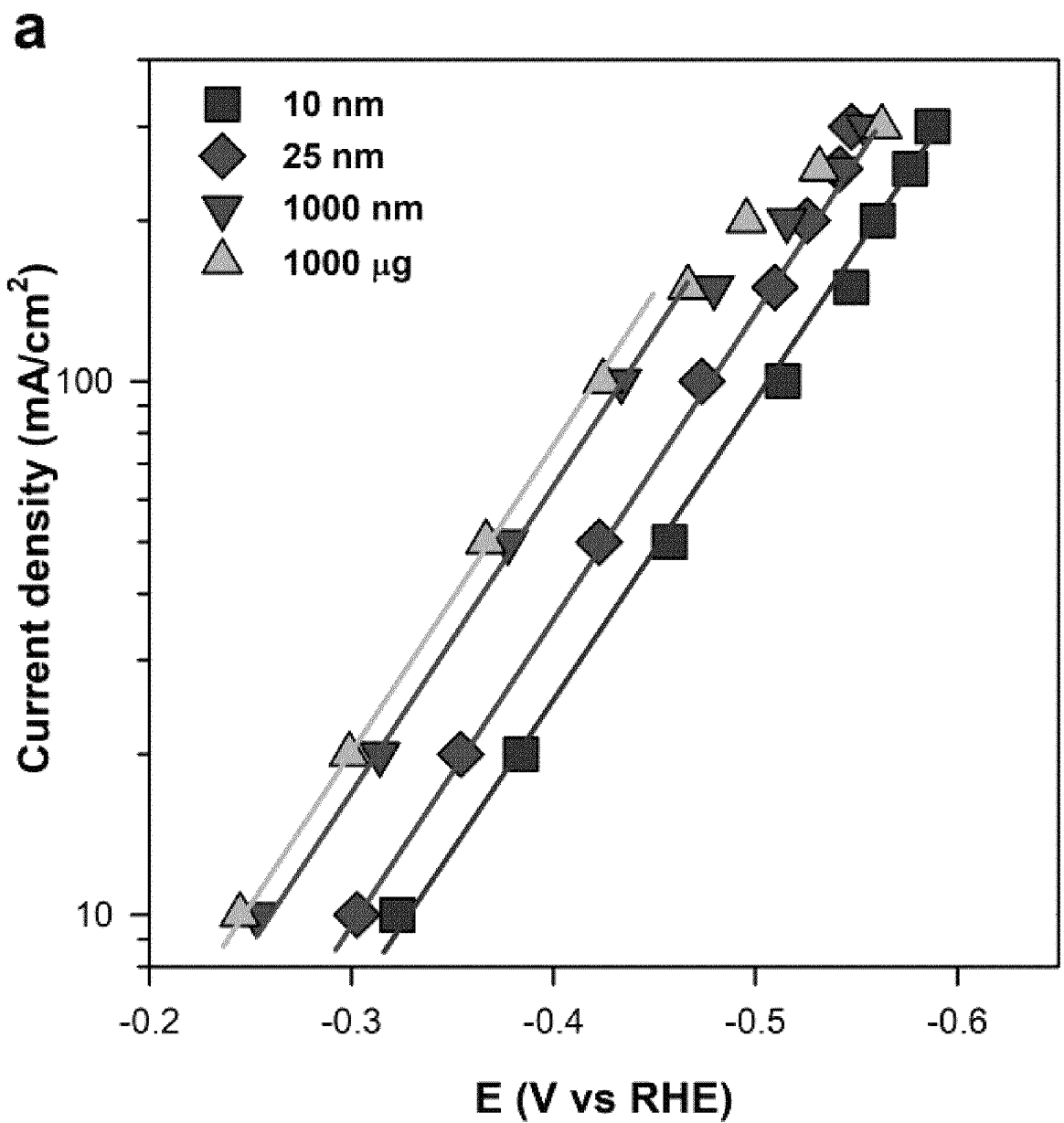
FIG. 12. Geometric reduction current density as a function of applied potential using 10 M KOH electrolyte on Cu samples of varying thickness. The 10 nm, 25 nm, and 1000 nm samples are thermally deposited, while the 1000 μg sample uses drop casted nanoparticles.

The $CO_2RR$ activity of the evaporated Cu samples was evaluated in the flow cell using KOH as the electrolyte. For comparison, commercial 25 nm Cu nanoparticles were also deposited on a gas diffusion layer with a loading of 1000 μg/cm$^2$ using a mechanical deposition (drop-casting) technique (sample MD, FIG. 11). FIG. 4a shows linear scanning voltammetry of the samples under $CO_2RR$ conditions using 10 M KOH. At less negative potentials (>−0.3 V vs RHE), all samples show similar slopes implying a similar intrinsic activity of the samples though high loading samples (MD and EV3) show higher current density compared to low loading sample (EV1 and EV2) due to their higher surface active area (FIG. 12). At more negative potentials; however; the reaction rates on EV1 and EV2 are higher than those of EV3 and MD, leading to a similar current density at −0.54 V vs RHE for all samples. This can be attributed to the improved $CO_2$ availability at higher current densities for the sharp reaction interfaces (EV1 and EV2) versus the more distributed reaction (EV3 and MD) as predicted in FIG. 2.

Figure 13:
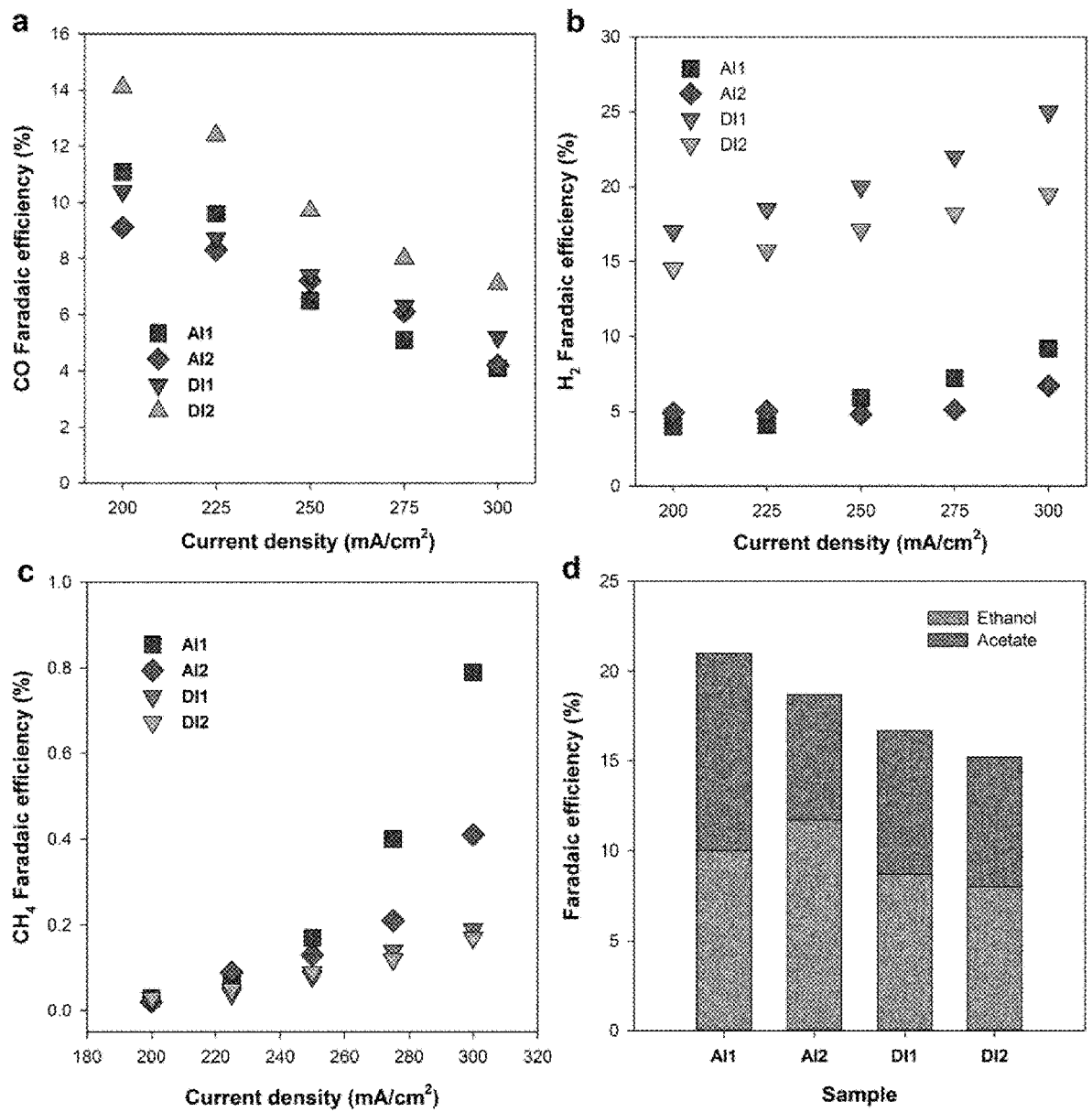
FIG. 13. Performance of Cu catalysts in 10 M KOH electrolyte. Faradaic efficiency for CO (a); $H_2$ (b) and $CH_4$ (c) on AI1, AI2, DI1, and DI2 catalysts using 10 M KOH electrolyte in the current range of 200 to 300 mA $cm^{-2}$. Faradaic efficiency for ethanol and acetate on the catalyst at the optimum current density for ethylene: AI1 (250 mA $cm^{-2}$); AI2 (275 mA $cm^{-2}$); DI1 and DI2 (225 mA $cm^{-2}$).
Figure 14A:
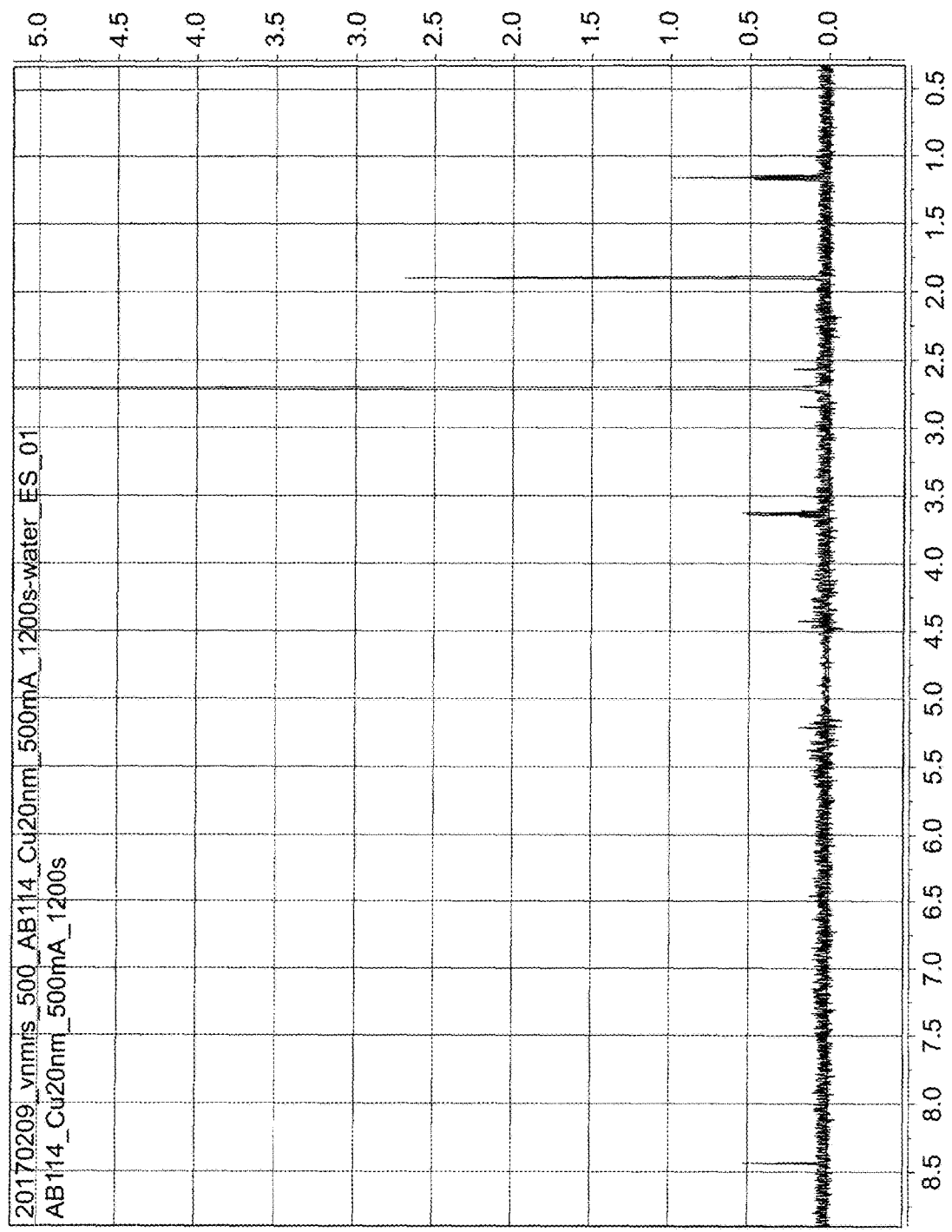
FIG. 14. Representative NMR spectra of the liquid products. NMR spectrum of the reaction products obtained upon $CO_2$RR on AI2 sample at current density of 275 mA $cm^{-2}$ using 10 M KOH electrolyte. (a) full spectrum (largest singlet at 2.71 ppm corresponds to the reference DMSO signal, while noisy part around 4.60 ppm is due to suppressed water signal); (b) magnified portion of the spectrum demonstrating ethanol and acetate product peaks; (c) magnified portion of the spectrum demonstrating the formation of a small amount of formate.
Figure 14B:
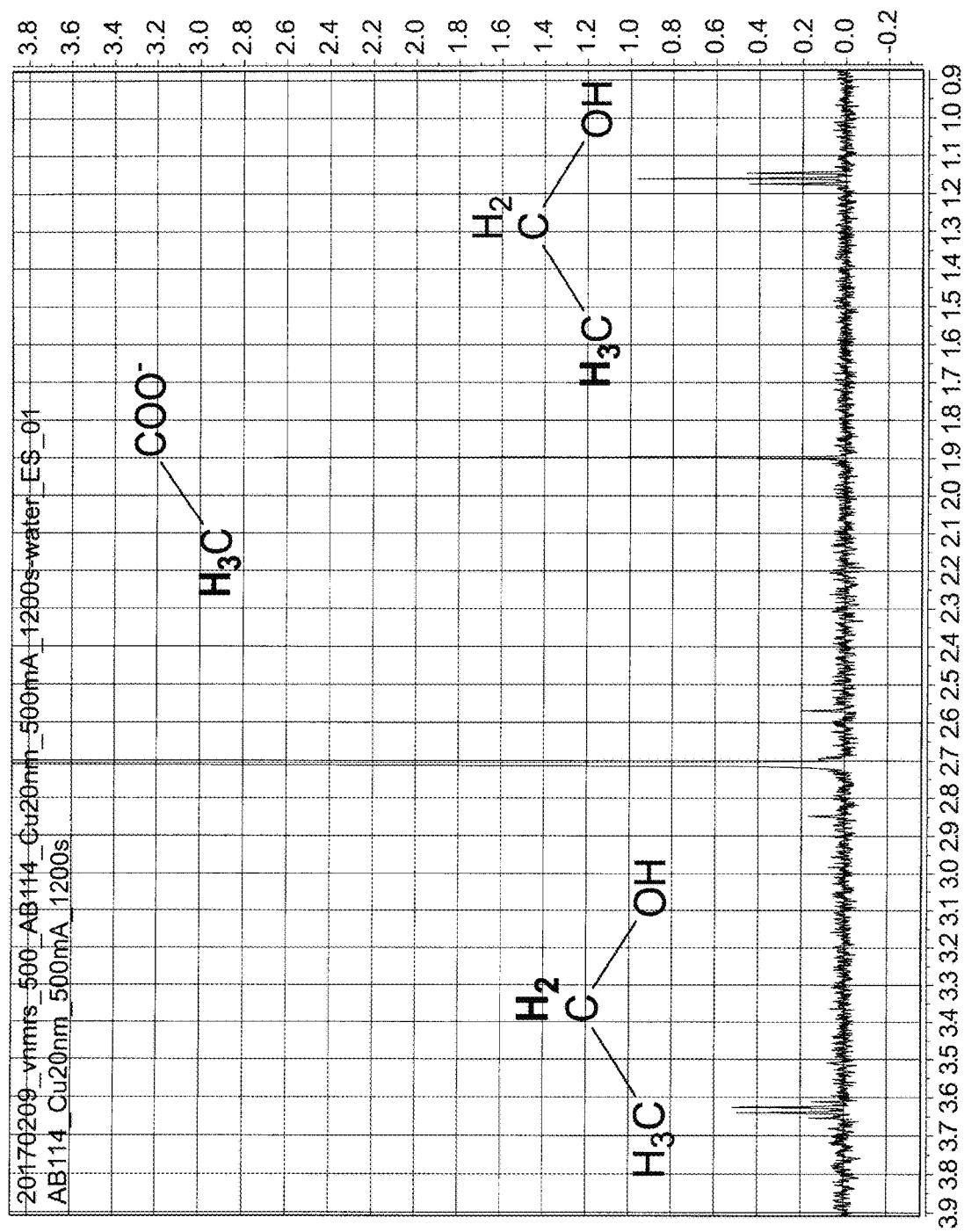
Figure 14C:
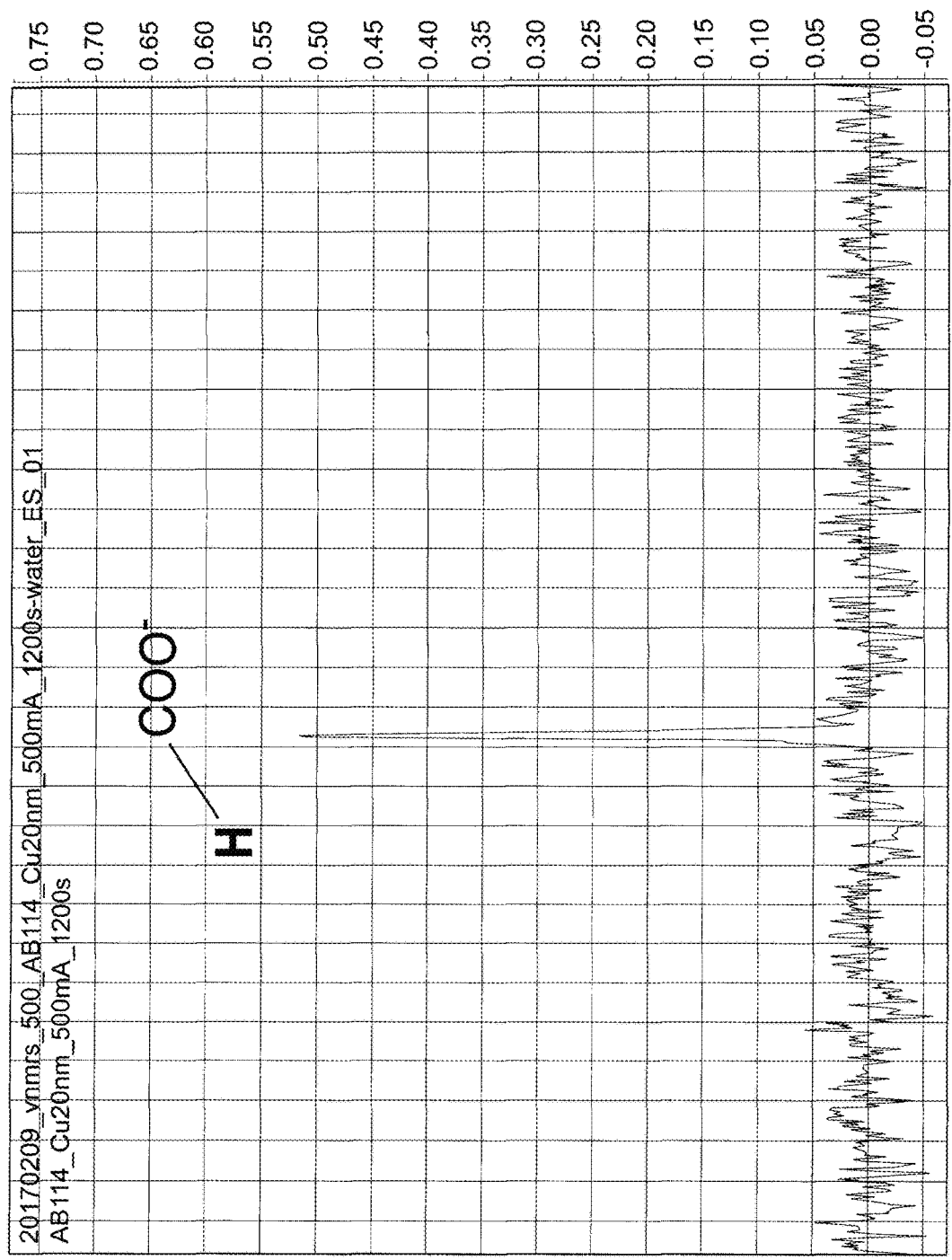
Figure 15:
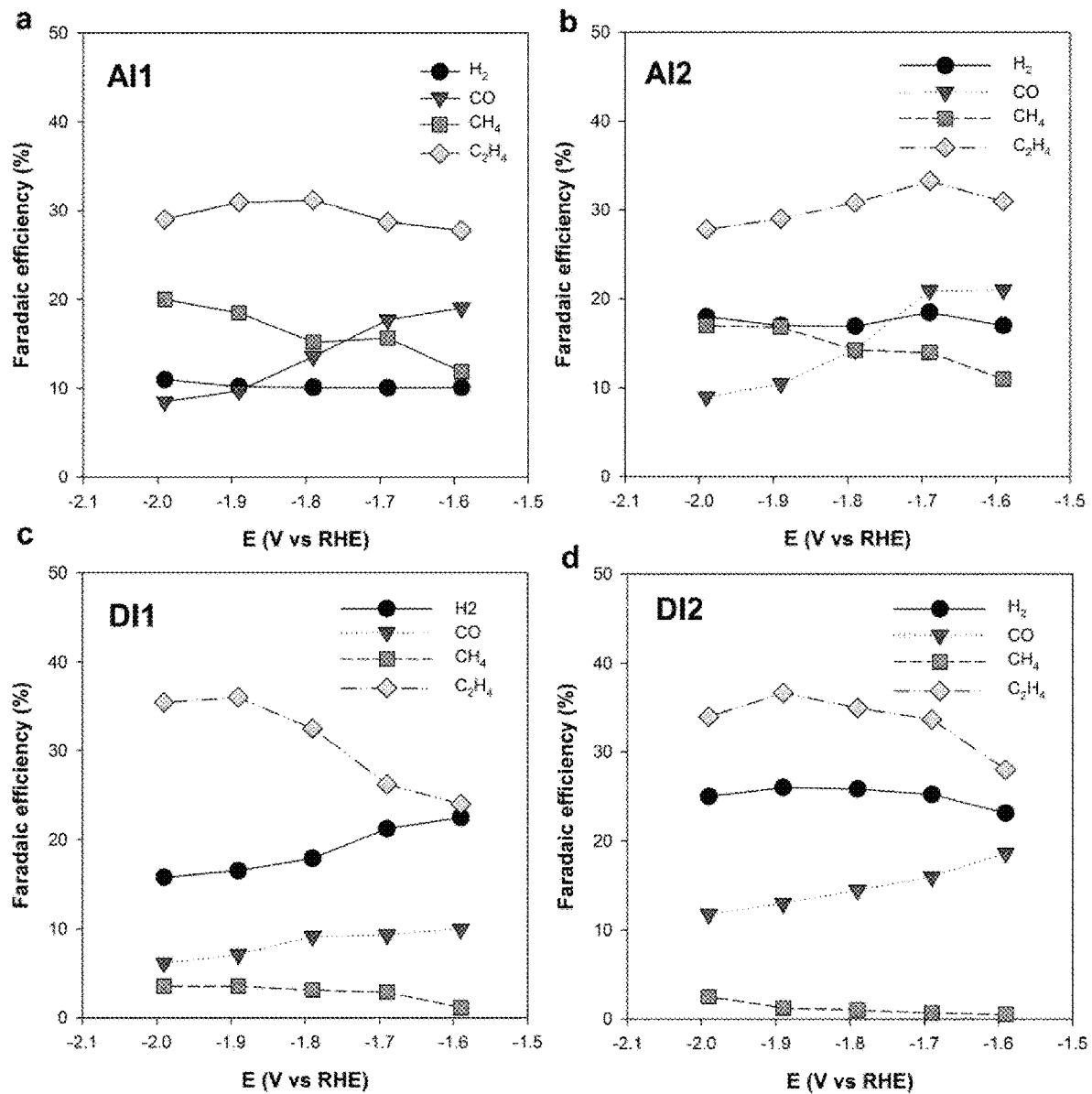
FIG. 15. Performance of Cu catalysts in an H-cell configuration. Faradaic efficiencies for gas products in the potential range of −1.6 to −2 V vs RHE (without iR correction) for AI1 (a); AI2 (b); DI1 (c); and DI2 (d). The electrolyte was 0.1 M $KHCO_3$ for all runs.

Analyzing product selectivity in 10 M KOH all samples show optimal ethylene production in the current range of 225 to 275 mA cm$^{-2}$ (FIG. 4b). Notably, both EV1 and EV2 samples show an ethylene Faradaic Efficiency higher than 60% with EV2 peaking at 67% ethylene along with an 11% ethanol and 6% acetate (FIGS. 13 and 14). Overall, EV2 shows a record total C2 selectivity of 84% at 275 mA cm$^{-2}$ and a low potential of −0.55 V vs RHE. Running the same catalysts in an H-cell configuration using 0.1M $KHCO_3$ all samples show an ethylene FE in the range of 35-40% with MD showing the highest ethylene selectivity (FIG. 15). This data confirms that the high C2 selectivity of EV2 sample in a flow cell originates from the morphology (i.e., reaction interface thickness) and the reaction environment rather than the nature of the catalyst itself. The sharp reaction interface also enables exceptionally high ethylene mass activity of higher than 7 A/mg, more than an order of magnitude higher than all previous reports (FIG. 4c).

Figure 2:
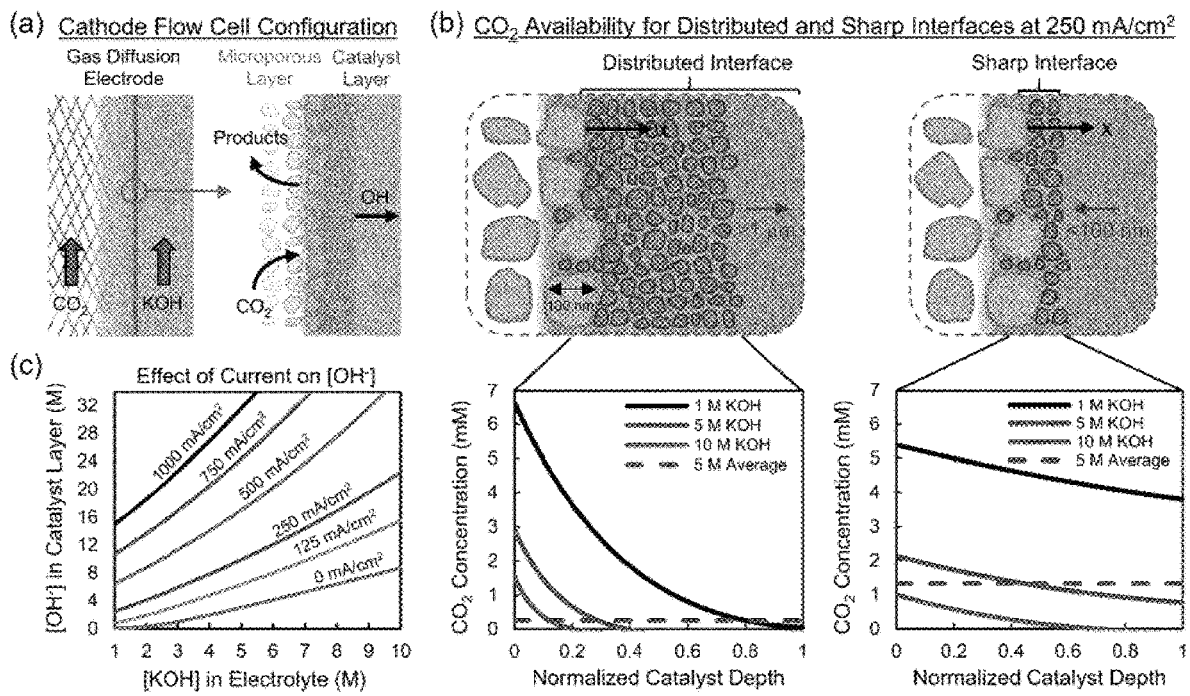
FIG. 2. Modeling of local OH and $CO_2$ concentration at the reaction interface in gas diffusion $CO_2$ reduction electrode. a) Schematic of the cathode portion of a gas-diffusion electrode for $CO_2$ reduction, d) $CO_2$ distribution across a 1 μm (left) and 100 nm (right) thick catalyst layer for various bulk KOH concentrations at a current density of 250 mA $cm^{-2}$, e) the effect of current density on the local $OH^-$ concentration for various electrolyte concentrations assuming a liquid diffusion thickness of 500 μm.
Figure 16:
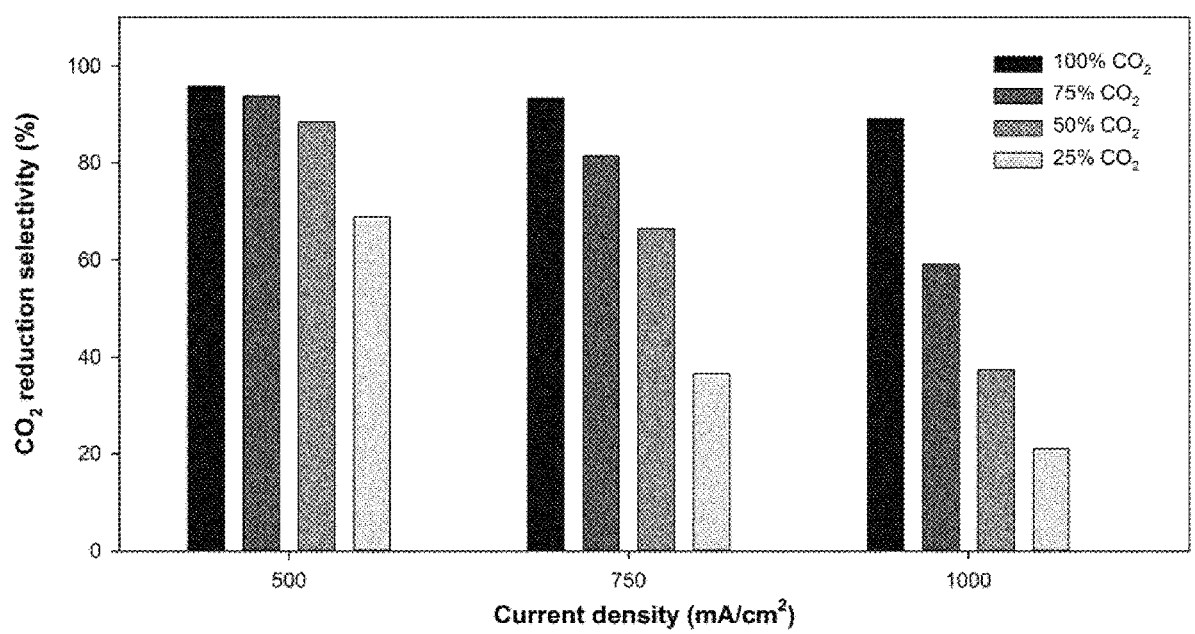
FIG. 16. Effect of $CO_2$ concentration on $CO_2$RR selectivity. $CO_2$ reduction selectivity on the AI2 sample at $CO_2$ gas concentration of 25, 50, 75 and 100%.
Figure 17:
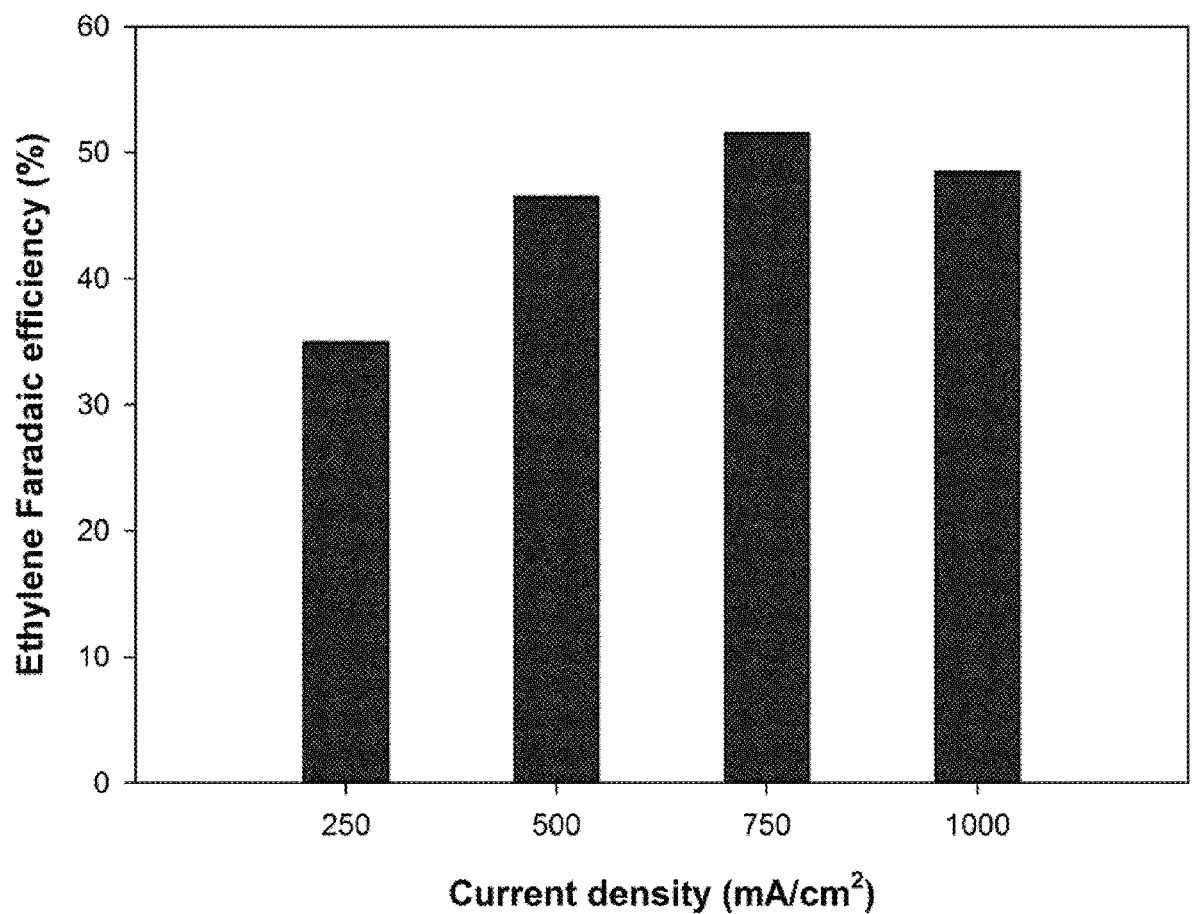
FIG. 17. Performance of the AI2 catalyst in low concentration KOH electrolyte. $C_2H_4$ Faradaic efficiency of the AI2 sample in 1 M KOH electrolyte at various current densities.

To shift $CO_2$ conversion towards higher current densities, the KOH concentration was reduced to 1 M KOH to reduce $CO_2$ availability limitations (FIG. 2). With the exception of the EV1 sample, both $CO_2RR$ selectivity and maximum current density improve with decreasing catalyst thickness with the EV2 sample reaching 90% selectivity for $CO_2$ reduction products at 1 A cm$^{-2}$, the highest reported $CO_2$ electrolyzer current density (FIG. 4d). As the physical catalysts are identical, the decreased hydrogen evolution rates can be attributed to the increased average $CO_2$ concentration across the electrode enabled by the decreased diffusion distance. To confirm the hypothesis, the $CO_2$ reduction selectivity is observed under varying $CO_2$ gas concentrations for the EV2 sample. As the partial pressure of $CO_2$ is decreased, the limiting $CO_2$ current density also decreases. Under the non-limited conditions at 500 mA cm$^{-2}$, however, the selectivity towards hydrogen grows from 5% to 15% when reducing the $CO_2$ partial pressure from 1 atm to 0.5 atm (FIG. 16). These results show the influence of $CO_2$ concentration on suppressing the competing hydrogen evolution reaction. Although high current densities can be achieved at low KOH concentrations, the selectivity for ethylene (about 51%, FIG. 17) is lower than at high KOH concentrations (67%).

Figure 5:
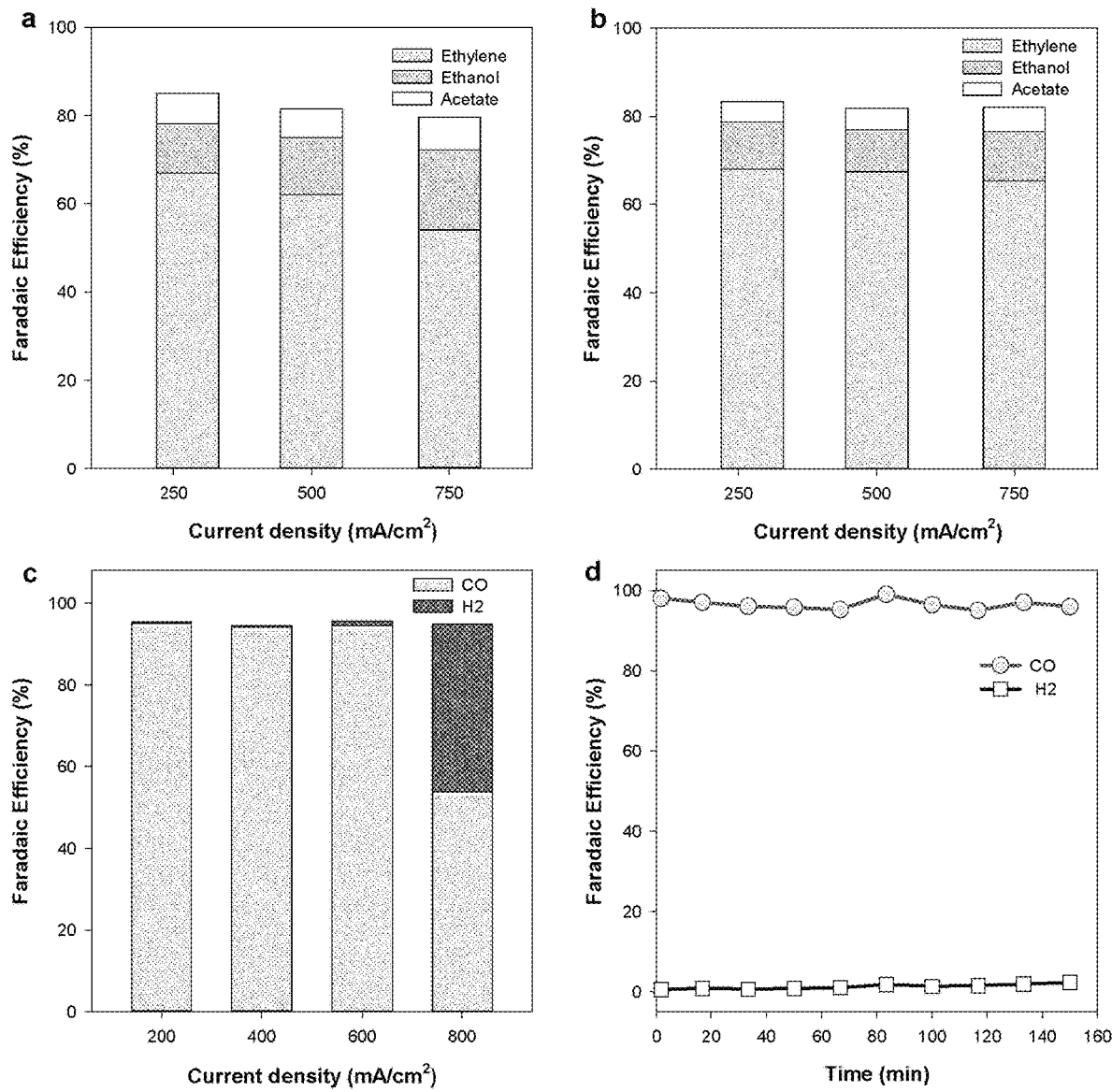
FIG. 5. High performance $CO_2$RR on sharp reaction interface sample. (a) Optimal C2 selectivity on EV2 sample using 10 M KOH (at 250 mA/$cm^2$); 5.5 M KOH (at 500 mA/$cm^2$); 3.5 M KOH (at 750 mA/$cm^2$). (b) Optimization of electrolyte for high ethylene selectivity on EV2 sample: 10M KOH+2M KI (at 250 mA/$cm^2$); 5.5 M KOH+4 M KI (at 500 mA/$cm^2$); and 3.5 M KOH+5 M KI (at 750 mA/$cm^2$). (c) $CO_2$RR on sharp reaction interface Ag electrode showing high CO selectivity at a record high current using 2 M KOH electrolyte. (d) Stability of Ag electrode at a current density of 300 mA/$cm^2$.
Figure 18:
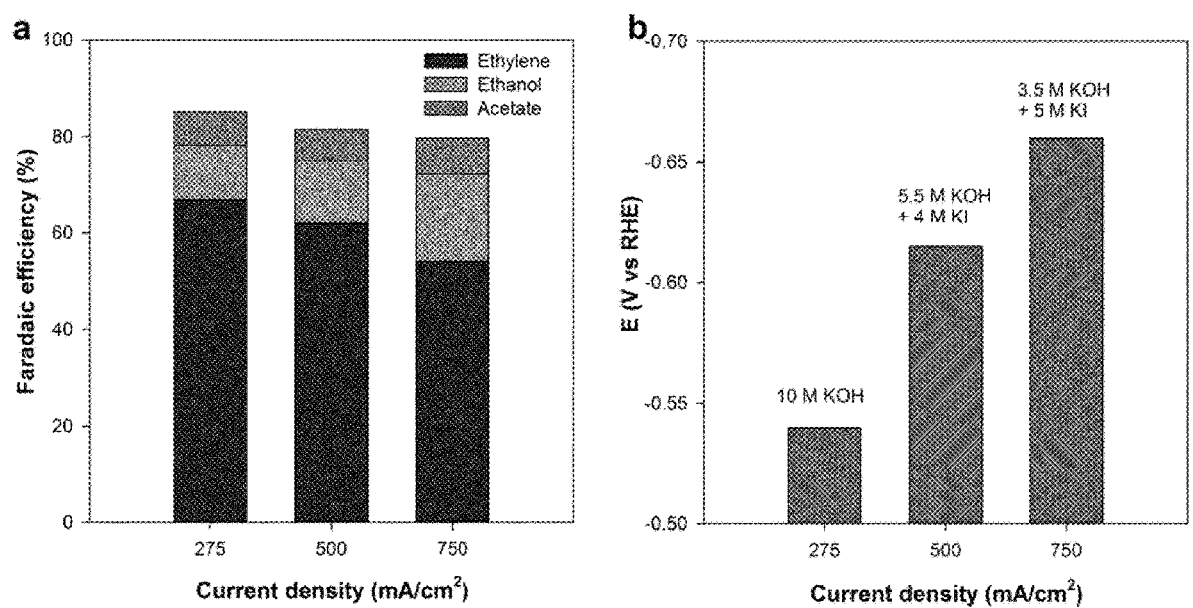
FIG. 18. High performance $CO_2$RR on an abrupt reaction interface sample. (a) Optimal C2 selectivity on the AI2 sample using 10 M KOH (at 275 mA $cm^{-2}$); 5.5 M KOH (at 500 mA $cm^{-2}$); 3.5 M KOH (at 750 mA/$cm^{-2}$). (b) Applied potentials (iR corrected) at different current densities on the AI2 sample using an optimized electrolyte for high $C_2H_4$ selectivity: 10 M KOH (at 275 mA $cm^{-2}$); 5.5 M KOH+4 M KI (at 500 mA/$cm^{-2}$); and 3.5 M KOH+5 M KI (at 750 mA/$cm^{-2}$). The corresponding $C_2H_4$ Faradaic efficiency to FIG. 18b is shown in FIG. 4a of the manuscript.

To achieve both high ethylene current density and selectivity in parallel, the study sought to balance $CO_2$ and OH availability within the electrolyte. From the experimental results and mass transport model the study took advantage of bulk and predicted current-generated OH to first identify an optimal local OH concentration that maintains C2 selectivity at low overpotentials. At a KOH concentration of 5.5 M, the study found an optimal ethylene selectivity of 60% and a total C2 Faradaic Efficiency of 81% at a current density of 500 mA cm$^{-2}$ (FIG. 5a). Reducing the KOH concentration to 3.3 M, we achieved a total C2 Faradaic Efficiency of 80% at 750 mA cm$^{-2}$, but the ethylene FE reduced to 52%. By adding a potassium halide, such as KI and KBr, to 5.5 and 3.5 M KOH to maintain a high potassium concentration the study was able to maintain ethylene selectivity with increasing current where the proportion of ethanol would typically increase. Using 5M KI+3.5M KOH electrolyte, the study achieved a total C2 of 82% in which 66% is ethylene at a current of 750 mA cm$^{-2}$ and a potential of −0.67 V vs RHE (FIG. 5b and FIG. 18). These ethylene and C2 partial current density of 500 and 615 mA cm$^{-2}$, respectively, far exceed previous reported performance (Table 1).

Figure 19:
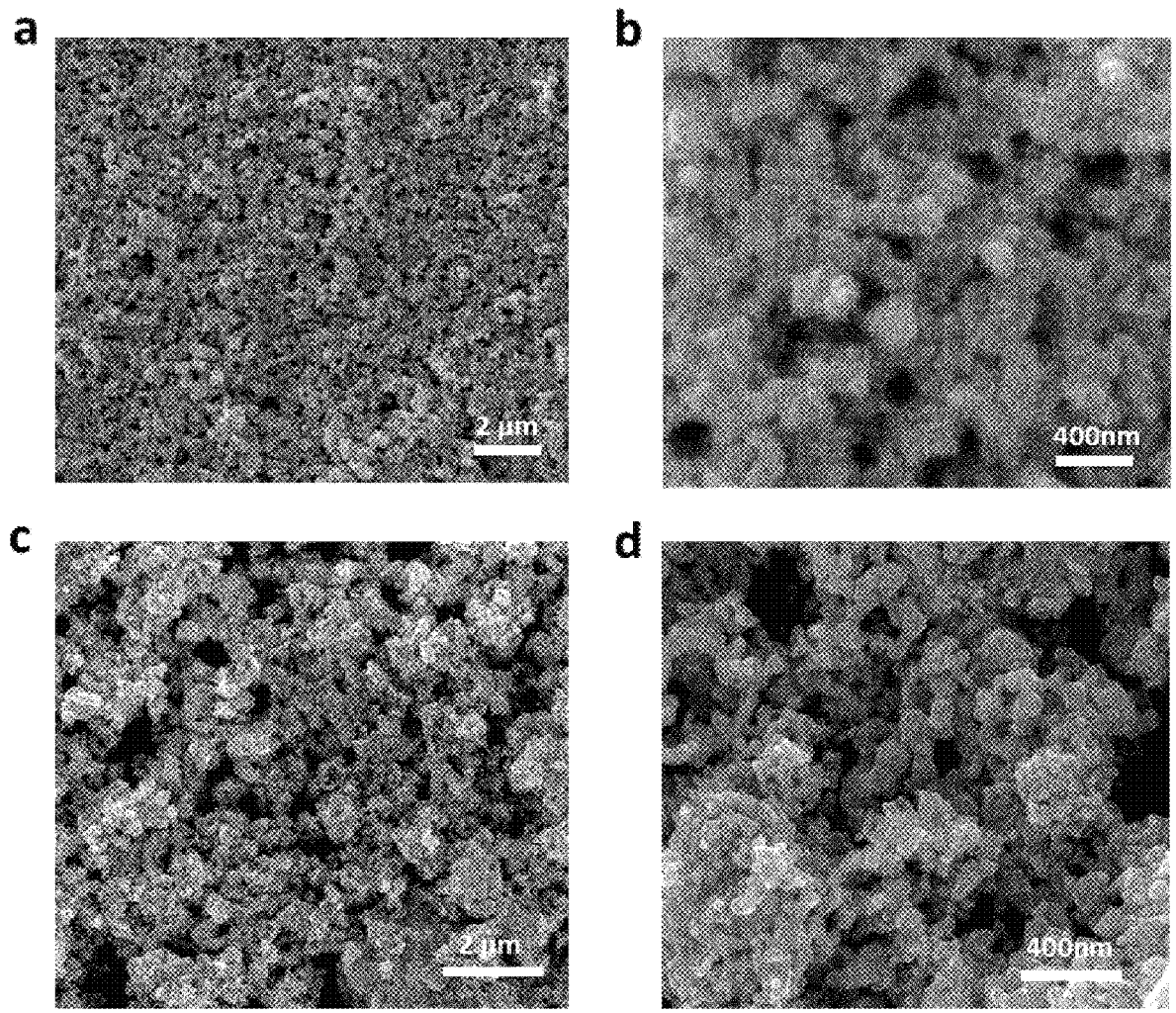
FIG. 19. SEM characterization of Ag catalyst. Al—Ag (a, b) and DI-Ag (c, d).
Figure 20:
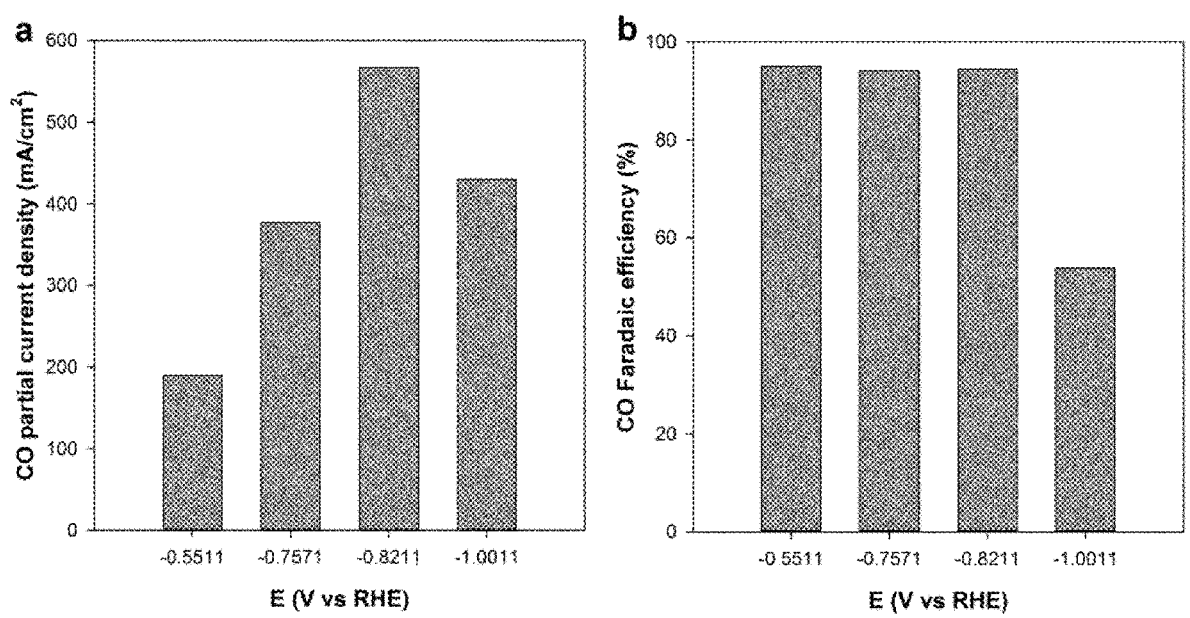
FIG. 20. $CO_2$RR performance of the Al—Ag catalyst. (a) CO partial current density and, (b) CO Faradaic efficiency at different potentials. The electrolyte is 2 M KOH.

Finally, the present disclosure extends the concept of a sharp reaction interface for $CO_2$ reduction in flow cells to CO production to show the adaptability of the study's system design to other reduction products. Using evaporated silver on a gas-diffusion electrode (see FIG. 19 for SEM characterization) the study shows in FIG. 5c and FIG. 20 that high CO selectivity can be obtained while again using an extremely thin layer of the precious metal catalyst. While the applied overpotential and product selectivities of 95% are on par with more finely tuned nanostructures in aqueous solutions, a partial current density of 600 mA cm$^{-2}$ is obtained at a potential of −1 V vs RHE after iR correction (FIG. 5c), showing the suppression of the competing hydrogen evolution reaction. The sample demonstrated high stability by producing CO for 2.5 hours without a drop in selectivity (FIG. 5d).

The ethylene onset potential of −0.2 V vs RHE, Faradaic efficiency of 67% and partial current density of 500 mA cm$^{-2}$ are believed to represent three substantial increases in performance as compared to existing literature. Operating in a rarely investigated experimental regime for $CO_2$ reduction, new insights into the role of hydroxide on C—C coupling were verified both experimentally and using DFT modeling. Paired with mass transport modeling at the nanoscale, a counterintuitive thin catalyst configuration was designed to manipulate the reaction environment of a Cu catalyst under the competing constraints of simultaneously high hydroxide and $CO_2$ concentrations. The resulting suppression of the primary competing reactions and promotion of C—C coupling towards C2+ products enabled higher current densities and selectivities than previous reports.

Further information is presented below regarding work on assessing abrupt fluid-solid interface that facilitated record carbon dioxide electroreduction to ethylene.

Supplementary Methods

DFT Calculations:

Vienna ab initio Simulation Package (VASP)[1] was used to perform all the plane wave density functional theory (DFT) computations. The projected augmented wave (PAVV) approach together with the generalized gradient approximation (GGA) parametrized by Perdew, Burke and Ernzerhof (PBE) are employed. Three different crystalline facets, (111), (100) and (110) of the pristine copper are approximated by a 4×4×4 slab in a 20 Å vacuum. Due to the vacuum, dipole corrections are implemented. To resemble the real bulk material and the surface, respectively, two bottom layers are fixed in their positions while the two top layers are free to move due to interaction with the adsorbates. A cut-off energy of 400 eV for the plane wave basis sets and a 4×4×1 Γ-centered Monkhorst-Pack mesh for the k-points sampling in the first Brillouin zone, with a first order Methfessel-Paxton smearing parameter a of 0.1 eV ensured that the energy convergence criteria is better than 1 meV. The k-points grid is doubled for charge density calculations. The self-consistent field (SCF) convergence criterion is set to 1×10$^{-4}$ eV for electronic iteration and the ionic relaxation continued until the maximum force was less than 0.02 eV/A. This was updated by the conjugate gradient approach.

Almost all previous literature indicates that the CO—CO coupling is pH independent because no proton participates in the coupling reaction. However, the study explicitly investigated the effect of OH on changing the electronic structure and, in turn, the coupling reaction energy. In this work, the study explicitly considered OH in the simulations to see how CO bonding and CO—CO coupling energies are affected.

One and two adsorbed carbon monoxides are simulated on all three surfaces with a varying number and proximity of hydroxides. In each case, different rational possible configurations (overall more than 200 configurations) are considered to find the global minima. The CO adsorption energy is calculated as:

$$E_{adsorption} = E_{*CO}^{n-OH} - (E_{*}^{n-OH} + E_{CO})$$

where, $E_{*CO}^{n-OH}$ is the electronic structure energy of the adsorbed CO on the catalyst with n OH ions on the surface, $E_{*}^{n-OH}$ is the energy of the slab without the CO adsorbate but includes n OH ions, and $E_{CO}$ is the CO energy in gas phase without the catalyst. The CO—CO coupling energy barrier is calculated according to the following reaction and the corresponding reaction free energy:

$$*OCCO = *CO + *CO$$

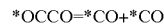

$$E_{C-C\ coupling\ barrier}^{n-OH} = E_{*OCCO}^{n-OH} - (E_{*CO}^{n-OH} + E_{*CO}^{n-OH})$$

In the study's simulations, 0, 1 and 2 OH are considered on a surface of 16 (4×4) copper atoms, corresponding to 0, 1/16 and 2/16 ML concentrations, respectively. However, in configurations where OH is very close to the adsorbed CO, it is assumed that the OH concentration is even higher and forced to be very close to the adsorbates, and the local minima is calculated in this case. These cases are virtually described by 3/16 and 4/16 ML in FIG. 1. Otherwise, in 0, 1/16 and 2/16 ML concentrations, the configuration with the global minima energy is the reference for the study's calculations. This includes all possible configurations for OH as adsorbed on the surface or as being in the vacuum just above the surface. The DFT energy of the optimized configurations with the global minimum energies are tabulated in Table 2. CO adsorption energies and the CO—CO coupling energy barriers are also mentioned in Table 3.

From FIG. 1 and the data in Table 3, the study sees that CO—CO coupling energy barrier decreases with increasing OH concentration. It is found that increasing the OH concentration on the slab surface implicitly changes the charge density of the C atoms in adsorbed CO and OCCO, such that CO bonding becomes weaker and CO—CO coupling becomes stronger and more favorable. On the (100) surface, for instance, CO without any OH is adsorbed on the hollow site with four bonds to the surrounding copper ions. However, increasing the OH concentration pushes CO to the bridge site with two folds bonding and weaker binding energy. This bonding becomes even weaker as OH is further added to the surface, such that OH in the vicinity pushes CO to the top site with one fold bonding. The same trend is observed on two other facets. FIG. 7 demonstrates this situation on (100).

In general, the study concluded that at higher OH concentrations CO bonding is weaker and this might lead to either more CO in gaseous products and easier CO—CO coupling. Indeed, both are shown under experimental conditions. The study calculated the electronic charge density on each ion by Bader charge analysis. As demonstrated in FIG. 7, one can see that increasing the OH concentration, not only decreases the CO—CO coupling energy barrier mentioned in FIG. 1 and Table 3, but also increases the charge difference between two C atoms in coupled carbon monoxides. This increased charge difference, makes a stronger intramolecular dipole and consequently more stable coupling due to the stronger ionic adsorption. The electronic charge distribution and also charge difference between two C atoms in coupled carbon monoxides, i.e. proportional to the dipole magnitude, are demonstrated in FIG. 7.

Modeling of $CO_2$ Diffusion into the Liquid Electrolyte:

The diffusion layer was modeled in MATLAB using the built-in pdepe solver taking into account the interactions between $CO_2$, $OH^-$, $HCO_3^-$ and $CO_3^{2-}$. The boundaries for the 1D simulations included a gas-liquid interface at the left boundary (x=0 μm) and a liquid diffusion boundary layer at the right boundary (x=500 μm) (see FIG. 8a). The catalyst layer extended from the left boundary into the electrolyte a specified distance and porosity. In all simulations, an electrochemical current distribution corresponding to a selectivity of 10% $H_2$, 10% CO and 80% (EtOH+$C_2H_4$) was assumed. The choice of selectivity affects the relative amount of $CO_2$ consumed per electron transferred as well as the $H^+$ consumed, and subsequently, $OH^-$ generated through water dissociation at the catalyst surface.

The diffusion equations used are adapted from $CO_2$ reduction modeling in neutral media and take into account carbonate equilibrium reactions, consumption of $CO_2$ and generation of $OH^-$ within the catalyst layer.

$$\frac{\partial [CO_2]}{\partial t} = D_{CO_2} \frac{\partial^2 [CO_2]}{\partial x^2} - [CO_2][OH^-]k_{1f} + [HCO_3^-]k_{1r} - R_{CO2} \quad (1)$$

$$\frac{\partial [HCO_3^-]}{\partial t} = D_{HCO_3^-} \frac{\partial^2 [HCO_3^-]}{\partial x^2} + [CO_2][OH^-]k_{1f} - [HCO_3^-]k_{1r} - [HCO_3^-][OH^-]k_{2f} + [CO_3^{2-}]k_{2r} \quad (2)$$

$$\frac{\partial [CO_3^{2-}]}{\partial t} = D_{CO_3^{2-}} \frac{\partial^2 [CO_3^{2-}]}{\partial x^2} + [HCO_3^-][OH^-]k_{2f} - [CO_3^{2-}]k_{2r} \quad (3)$$

$$\frac{\partial [OH^-]}{\partial t} = D_{OH^-} \frac{\partial^2 [OH^-]}{\partial x^2} - [CO_2][OH^-]k_{1f} + [HCO_3^-]k_{1r} - [HCO_3^-][OH^-]k_{2f} + [CO_3^{2-}]k_{2r} + R_{OH} \quad (4)$$

The consumption of $CO_2$ and generation of $OH^-$ within the catalyst layer is assumed to occur homogeneously throughout such that:

$$R_{CO2} = \begin{cases} \frac{j}{F}\left(\frac{FE_{H2}}{n_{e,H2}} + \frac{FE_{CO}}{n_{e,CO}} + \frac{FE_{C2H4}}{n_{e,C2H4}}\right)\frac{\varepsilon}{L_{catalyst}}, & 0 \leq x \leq L_{catalyst} \\ 0, & x > L_{catalyst} \end{cases} \quad (5)$$

$$R_{OH} = \begin{cases} \frac{j}{F}\frac{\varepsilon}{L_{catalyst}}, & 0 \leq x \leq L_{catalyst} \\ 0, & x > L_{catalyst} \end{cases} \quad (6)$$

where the catalyst length, $L_{catalyst}$, and catalyst porosity, ε, are predefined. A porosity of 60% was chosen in all scenarios. All equilibrium and rate constants are calculated as a function of temperature and salinity as discussed previously.

The left boundary condition for Eq. 1 was set as the solubility limit of $CO_2$ in a specified bulk KOH concentration assuming a partial pressure of 1 atm and temperature of 298 K at the gas-liquid interface. The maximum solubility of $CO_2$ in KOH electrolyte was modeled using Henry's constant and the Sechenov equation to account for 'salting out' effects (FIG. 8b). A no-flux boundary condition was applied for $CO_2$ at the right-hand boundary. For $OH^-$, $HCO_3^-$ and $CO_3^{2-}$ no-flux boundary conditions were applied at the left boundary while the concentrations at the right boundary were set to the equilibrium values in the specified bulk KOH concentration.

Simulations were performed by prescribing current density, selectivity, bulk KOH concentration and catalyst layer thickness. The concentration of $CO_2$ as a function of electrolyte penetration depth from the left-hand boundary could then be found for a variety of inputs as shown in FIG. 2 and FIG. 8. Average $CO_2$ concentrations presented in FIG. 2 correspond to the average $CO_2$ concentration across the prescribed catalyst layer thickness. As seen in FIG. 8c the KOH media is particularly parasitic to $CO_2$ and is neutralized by $OH^-$ well before the 500 μm liquid diffusion boundary.

Material Synthesis:

The Freudenberg (Fuel cell Store) gas diffusion layer (GDL) was used as substrate to evaporate Cu (99.99%) and Ag (99.99%) using Angstrom Nexdep Evaporator. The deposition was performed in ~$10^{-5}$-$10^{-6}$ Torr at 1.5 Å/sec. The thicknesses of the AI1, AI2 and DI1 samples were 10 nm, 25 nm, and 1000 nm, respectively. The thickness of Al—Ag was 50 nm. The DI2 and DI-Ag samples were prepared by drop-casting commercial Cu and Ag nanoparticles (Sigma-Aldrich, particle size smaller than 100 nm). The nanoparticles were first dispersed in a mixture of isopropanol, water and nafion solution (50 microliter of nafion solution in 1 mL of 3:1 isopropanol:water mixture). The mixture was then sonicated for 1 hour to produce Cu and Ag nanoparticle inks. The Cu and Ag catalysts were painted on the gas diffusion layer and dried overnight at room temperature. Silver nanoparticles were deposited on gas diffusion layer using the same procedure as for Cu nanoparticles.

Characterization:

The morphologies of the prepared electrodes were investigated using Scanning Electron Microscopy (SEM) on a Hitachi SU-8230 apparatus and Transmission Electron Microscopy (TEM) on a Hitachi HF-3300 instrument with an acceleration voltage of 200 kV.

Cross-sectional elemental mapping was performed using a Hitachi CFE-TEM HF3300, the Cu coated GDL sample was prepared using Hitachi Dual-beam FIB-SEM NB5000. Briefly, a slice (~50-100 nm thick) of Cu coated GDL was cut using Ga-beam and attached with a TEM stage with tungsten deposition and lifted out for subsequent STEM-EDX analysis.

The structural characteristics of the Cu electrodes were measured by powder X-ray diffraction at room temperature on a MiniFlex600 instrument with a copper target (A=1.54056 Å). The oxidation state and compositions of the samples were studied by X-ray photoelectron spectroscopy (XPS) (model 5600, Perkin-Elmer). The binding energy data were calibrated with reference to the C 1s signal at 284.5 eV. The Cu loading on the gas diffusion layer was characterized using an inductively coupled plasma optical emission spectrometer (ICP-OES, Agilent Dual-View 720 with a charge-coupled device (CCD) detector for full wavelength coverage between 167 nm and 785 nm).

$CO_2$ Reduction:

Electroreduction for the main figure results were performed in a flow cell configuration consisting of a gas diffusion layer, anion exchange membrane and nickel mesh anode (FIG. 2a). In both the Abrupt Interface (AI) and Distributed Interface (DI) cases a catalyst was deposited on top of the microporous side of the Freudenberg gas diffusion layer. The combined catalyst and diffusion layer, anion exchange membrane and nickel anode were then positioned and clamped together using PTFE spacers such that a liquid electrolyte could be introduced into the chambers between the anode and membrane as well as the membrane and the cathode. Gaseous $CO_2$ could then be passed behind the gas diffusion layer and diffuse into the liquid electrolyte present at the catalyst. In the catholyte stream a port drilled into the PTFE spacer is present for an Ag/AgCl reference electrode to be positioned a specific distance from the working electrode.

All $CO_2$ reduction experiments were performed using an electrochemical workstation (Autolab PGSTAT302N) with a Ag/AgCl reference (with 3 M KCl as the filling solution). Electrode potentials after iR compensation were rescaled to the reversible hydrogen electrode (RHE) reference by $E_{RHE}=E_{Ag/AgCl}+0.197$ V+$0.0591 \times pH$. All potentials reported here were obtained by averaging over a timespan of at least 150 s for each applied current.

The electrolytes (KOH solution of various concentrations, 100 mL) were circulated through the electrochemical cell using peristaltic pumps. The electrolyte flow was keep at 10 mL min$^{-1}$. The $CO_2$ (Linde, 99.99%) flow was kept constant at 50 mL min$^{-1}$ using a mass flow controller. All $CO_2$ reduction experiments were performed under galvanostatic mode. The reactions were run for at least 150 s before the gas products were collected for analysis.

The gas products from $CO_2$RR (CO, $H_2$, $CH_4$ and $C_2H_4$) were analyzed using a gas chromatograph (PerkinElmer Clarus 680) coupled with a thermal conductivity detector (TCD) and a flame ionization detector (FID). The gas chromatograph was equipped with a Molecular Sieve 5A capillary column and a packed Carboxen-1000 column. Argon (Linde, 99.999%) was used as the carrier gas.

The liquid products were quantified using Nuclear magnetic resonance spectroscopy (NMR). $^1$H NMR spectra of freshly acquired samples were collected on Agilent DD2 500 spectrometer in 10% $D_2O$ using water suppression mode, with Dimethyl sulfoxide (DMSO) as an internal standard. Sixteen second relaxation time between the pulses was used to allow for complete proton relaxation.

The $CO_2$ reduction experiments using Cu catalysts (AI1, AI2, DI1, DI2) were also performed in an H-cell configuration as controls. The electrolytes for both the cathode and anode in this case were 0.1 $KHCO_3$. $CO_2$ gas was bubbled through the catholyte for at least 30 min to saturate the electrolyte with $CO_2$. The reactions were performed under potentiostatic mode with the potential range of −1.6 to −2 V vs RHE (without iR correction). The $CO_2$ flow was controlled at 30 mL min$^{-1}$. The gas and liquid products were analyzed after 1 hour of reaction using gas chromatography and NMR as described above.

TABLE 1

Summary of $CO_2$RR to $C_2H_4$ performance on different catalysts

| Catalyst | $C_2H_4$ onset potential (V vs RHE) | $J(C_2H_4)$ mA cm$^{-2}$ | $C_2H_4$ Faradaic efficiency (%) | $C_2H_4$ energy conversion (%)[a] | $C_2H_4$ mass activity (A mg$^{-1}$) | Reference |
|---|---|---|---|---|---|---|
| Plasma-Oxidized Cu | −0.6 | 12 | 60 | 33 | — | Reference 9 |
| Plasma-Cu Nanocubes | −0.6 | 16 | 40 | 25 | — | Reference 10 |
| N-doped graphene dots | −0.45 | 40 | 33 | 18 | 0.08 | Reference 11 |
| Cu nanostructure | ~−0.3 | 100 | 40 | 23 | 0.33 | Reference 12 |
| Cu nanodendrites | — | 97 | 55 | 28 | — | Reference 13 |
| Cu nanoparticles | −0.36 | 150 | 36 | 23 | 0.15 | Reference 14 |
| AFSI-Cu | −0.18 | 500 | 66 | 40 | 17.8 | This work |
| AFSI-Cu | −0.18 | 184 | 67 | 44 | 6.7 | This work |

[a]$C_2H_4$ energy efficiency is calculated for the half-cell (i.e. assuming the overpotential of the oxygen evolution reaction is zero). $C_2H_4$ energy efficiency = $(1.23 + (-E_{C2H4}))*FE(C_2H_4)/(1.23 + (-E))$, where E is the applied potential vs RHE; $E_{C2H4}$ = 0.08 V is thermodynamic potential (vs RHE) of $CO_2$ reduction to ethylene; FE($C_2H_4$) is the measured $C_2H_4$ Faradaic efficiency in percentage.

TABLE 2

Ground state energy of the adsorbates on three different facets of the copper

| | Ground state energy (eV) | | |
|---|---|---|---|
| Adsorbates | 111 | 100 | 110 |
| CO | −14.767 | −14.767 | −14.767 |
| Cu | −247.790 | −243.406 | −299.709 |
| Cu—OH | −258.531 | −254.334 | −310.672 |
| Cu—2OH | −269.182 | −265.208 | −321.635 |
| Cu—CO | −263.479 | −259.149 | −315.372 |
| Cu—CO—OH | −274.225 | −270.036 | −326.168 |
| Cu—CO—2OH | −284.884 | −280.898 | −336.956 |
| Cu—2CO | −279.154 | −274.791 | −331.114 |
| Cu—2CO—OH | −289.804 | −285.540 | −342.020 |
| Cu—2CO—2OH | −300.390 | −296.602 | −352.896 |
| Cu—OCCO | −277.486 | −273.830 | −329.684 |
| Cu—OCCO—OH | −288.273 | −284.673 | −340.667 |
| Cu—OCCO—2OH | −298.934 | −295.757 | −351.496 |

TABLE 3

CO adsorption energy and C-C coupling energy barrier on three different facets of copper at different OH concentrations

| OH Concentration | CO adsorption energy (eV) | | | CO-CO coupling energy barrier (eV) | | |
|---|---|---|---|---|---|---|
| | 111 | 100 | 110 | 111 | 100 | 110 |
| 0 | −0.922 | −0.976 | −0.897 | 1.668 | 0.961 | 1.430 |
| 1/16 | −0.927 | −0.935 | −0.730 | 1.530 | 0.867 | 1.353 |
| 2/16 | −0.936 | −0.924 | −0.555 | 1.456 | 0.845 | 1.400 |
| 3/16 | −0.686 | −0.919 | −0.726 | 1.371 | 0.822 | 1.304 |
| 4/16 | −0.556 | −0.823 | −0.495 | 1.234 | 0.763 | 1.382 |

TABLE 4

Physical properties of KOH electrolyte and its effect on the $C_2H_4$ onset potential and Tafel slope

| KOH concentration (M) | Resistance (Ω) [a] | Surface pH [b] | $C_2H_4$ onset potential (V vs RHE) [c] | Tafel slope (mV per decade) [d] |
|---|---|---|---|---|
| 1 | 2.58 | 12.40 | −0.48 | 150 |
| 5 | 1.08 | 14.48 | −0.29 | 112 |
| 10 | 0.98 | 14.94 | −0.18 | 65 |
| 15 | 1.32 | 15.16 | −0.20 | 95 |

[a] Measured using electrochemical impedance spectroscopy (EIS);
[b] Calculated in the diffusion model taking into account the effect of $CO_2$ gas in the catalyst layer;
[c] The potential at which the catalyst shows an ethylene faradaic efficiency of 0.5%;
[d] Calculated based on the experimental $C_2H_4$ partial current densities.

The following is a list of references the entire contents of which are hereby incorporated herein by reference. It is also noted that the entire contents of all documents mentioned herein are incorporated herein by reference.

Liu, M. et al. Enhanced electrocatalytic CO2 reduction via field-induced reagent concentration. *Nature* 537, 382-386 (2016).

Roberts, F. S., Kuhl, K. P. & Nilsson, A. High Selectivity for Ethylene from Carbon Dioxide Reduction over Copper Nanocube Electrocatalysts. *Angew. Chem. Int. Ed.* 54, 5179-5182 (2015).

Ren, D. et al. Selective Electrochemical Reduction of Carbon Dioxide to Ethylene and Ethanol on Copper(I) Oxide Catalysts. *ACS Catal.* 5, 2814-2821 (2015).

Chen, Y., Li, C. W. & Kanan, M. W. Aqueous CO2 Reduction at Very Low Overpotential on Oxide-Derived Au Nanoparticles. *J. Am. Chem. Soc.* 134, 19969-19972 (2012).

Wu, J. et al. Achieving Highly Efficient, Selective, and Stable CO2 Reduction on Nitrogen-Doped Carbon Nanotubes. *ACS Nano* 9, 5364-5371 (2015).

Thorson, M. R., Siil, K. I. & Kenis, P. J. A. Effect of Cations on the Electrochemical Conversion of CO2 to CO. *J. Electrochem. Soc.* 160, F69-F74 (2013).

Kas, R., Kortlever, R., Yilmaz, H., Koper, M. T. M. & Mul, G. Manipulating the Hydrocarbon Selectivity of Copper Nanoparticles in CO2 Electroreduction by Process Conditions. *ChemElectroChem* 2, 354-358 (2015).

Reller, C. et al. Selective Electroreduction of CO2 toward Ethylene on Nano Dendritic Copper Catalysts at High Current Density. *Adv. Energy Mater.* n/a-n/a (2017). doi: 10.1002/aenm.201602114

Mistry, H. et al. Highly selective plasma-activated copper catalysts for carbon dioxide reduction to ethylene. *Nat. Commun.* 7, 12123 (2016).

Xiao, H., Cheng, T., Goddard, W. A. & Sundararaman, R. Mechanistic Explanation of the pH Dependence and Onset Potentials for Hydrocarbon Products from Electrochemical Reduction of CO on Cu (111). *J. Am. Chem. Soc.* 138, 483-486 (2016).

Ma, S. et al. One-step electrosynthesis of ethylene and ethanol from CO2 in an alkaline electrolyzer. *J. Power Sources* 301, 219-228 (2016).

Li, C. W., Ciston, J. & Kanan, M. W. Electroreduction of carbon monoxide to liquid fuel on oxide-derived nanocrystalline copper. *Nature* 508, 504-507 (2014).

Stamenkovic, V. R., Strmcnik, D., Lopes, P. P. & Markovic, N. M. Energy and fuels from electrochemical interfaces. *Nat. Mater.* 16, 57-69 (2017).

Subbaraman, R. et al. Enhancing Hydrogen Evolution Activity in Water Splitting by Tailoring $Li^+$—$Ni(OH)_2$—Pt Interfaces. *Science* 334, 1256-1260 (2011).

Roberts, F. S., Kuhl, K. P. & Nilsson, A. Electroreduction of Carbon Monoxide Over a Copper Nanocube Catalyst: Surface Structure and pH Dependence on Selectivity. *ChemCatChem* 8, 1119-1124 (2016).

Kortlever, R., Shen, J., Schouten, K. J. P., Calle-Vallejo, F. & Koper, M. T. M. Catalysts and Reaction Pathways for the Electrochemical Reduction of Carbon Dioxide. *J. Phys. Chem. Lett.* 6, 4073-4082 (2015).

Kresse, G. & Furthmüller, J. Efficient iterative schemes for ab initio total-energy calculations using a plane-wave basis set. *Phys. rev. B* 54, 11169 (1996).

Kresse, G. & Joubert, D. From ultrasoft pseudopotentials to the projector augmented-wave method. *Phys. Rev. B* 59, 1758 (1999).

Blöchl, P. E. Projector augmented-wave method. *Phys. rev. B* 50, 17953 (1994).

Perdew, J. P., Burke, K. & Ernzerhof, M. Generalized gradient approximation made simple. *Phys. rev. lett.* 77, 3865 (1996).

Tang, W., Sanville, E. & Henkelman, G. A grid-based Bader analysis algorithm without lattice bias. *Phys.: Condens. Matter.* 21, 084204 (2009).

Singh, M. R., Clark, E. L. & Bell, A. T. Effects of electrolyte, catalyst, and membrane composition and operating conditions on the performance of solar-driven electrochemical reduction of carbon dioxide. *Phys. Chem. Chem. Phys.* 17, 18924-18936 (2015).

Burdyny, T. et al. Nanomorphology-enhanced gas-evolution intensifies $CO_2$ reduction electrochemistry. *ACS Sustainable Chem. Eng.* 5, 4031-4040 (2017).

Weisenberger, S. & Schumpe, d. A. Estimation of gas solubilities in salt solutions at temperatures from 273 K to 363 K. *AlChE Journal* 42, 298-300 (1996).

Mistry, H. et al. Highly selective plasma-activated copper catalysts for carbon dioxide reduction to ethylene. *Nat. Commun.* 7, 12123 (2016). (Ref 9 in Table 1)

Gao, D. et al. Plasma-activated copper nanocube catalysts for efficient carbon dioxide electroreduction to hydrocarbons and alcohols. *ACS nano* 11, 4825-4831 (2017). (Ref 10 in Table 1)

Wu, J. et al. A metal-free electrocatalyst for carbon dioxide reduction to multi-carbon hydrocarbons and oxygenates. *Nat. Commun.* 7, 13869 (2016). (Ref 11 in Table 1)

Hoang, T. T., Ma, S., Gold, J. I., Kenis, P. J. & Gewirth, A. A. Nanoporous copper films by additive-controlled electrodeposition: $CO_2$ reduction catalysis. *ACS Catal.* 7, 3313-3321 (2017). (Ref 12 in Table 1)

Reller, C. et al. Selective electroreduction of $CO_2$ toward ethylene on nano dendritic copper catalysts at high current density. *Adv. Energy Mater.* 7, 1602114 (2017). (Ref 13 in Table 1)

Ma, S. et al. One-step electrosynthesis of ethylene and ethanol from $CO_2$ in an alkaline electrolyzer. *J. Power Sources* 301, 219-228 (2016). (Ref 14 in Table 1)

It will be appreciated from the overall description and the experimentation section in particular that the catalysts as well as the associated methods described herein can have a number of optional features, variations, and applications.

The invention claimed is:

1. An abrupt interface $CO_2$ electroreduction catalyst for converting $CO_2$ into a multi-carbon compound, comprising:
   a porous gas diffusion layer having a gas-contacting side configured for contacting a $CO_2$ gas and allowing passage of the $CO_2$ gas toward an opposed reaction interface side, the porous gas diffusion layer being composed of a hydrophobic material; and
   a catalytic layer disposed on and covering the reaction interface side of the porous gas diffusion layer and having an electrolyte-contacting side configured for contacting an aqueous electrolyte, the catalytic layer being:
   hydrophilic allowing penetration of the aqueous electrolyte therethrough to form a gas-liquid interface on an opposed reaction interface side of the catalyst layer;
   composed of one or more metals selected to convert the $CO_2$ into the multi-carbon compound at determined electroreduction conditions; and
   sufficiently thin to prevent diffusion limitations of the $CO_2$ in the aqueous electrolyte and provide selectivity for the multi-carbon compound, wherein the catalyst layer has a thickness in the range of 10 nm to 100 nm or has a thickness below 50 nm.

2. The abrupt interface $CO_2$ electroreduction catalyst of claim 1, wherein the thickness of the catalyst layer is in the range of 10 nm to 100 nm.

3. The abrupt interface $CO_2$ electroreduction catalyst of claim 1, wherein the thickness of the catalyst layer is below 50 nm.

4. The abrupt interface $CO_2$ electroreduction catalyst of claim 1, wherein the catalyst layer is made of one or more metals comprising Cu, Ag, Au, Pd, Sn, Ni, Cr, and Zn and alloys thereof.

5. The abrupt interface $CO_2$ electroreduction catalyst of claim 1, wherein the catalyst layer has Cu as the only metallic component.

6. The abrupt interface $CO_2$ electroreduction catalyst of claim 1, wherein the catalyst layer is deposited on the porous gas diffusion layer by a physical vapor deposition technique.

7. The abrupt interface $CO_2$ electroreduction catalyst of claim 6, wherein the catalyst layer is deposited on the porous gas diffusion layer by thermal evaporation or sputtering.

8. The abrupt interface $CO_2$ electroreduction catalyst of claim 1, wherein the gas diffusion layer is composed of a hydrophobic porous carbon material.

9. The abrupt interface $CO_2$ electroreduction catalyst of claim 1, wherein the gas diffusion layer is composed of at least one hydrophobic and current collection material.

10. The abrupt interface $CO_2$ electroreduction catalyst of claim 9, wherein the gas diffusion layer has a pore size between 0.1 micrometer and 0.3 micrometer.

11. The abrupt interface $CO_2$ electroreduction catalyst of claim 1, wherein the reaction interface side of the porous gas diffusion layer has a roughness between 1 micrometer and 3 micrometers.

12. The abrupt interface $CO_2$ electroreduction catalyst of claim 11, wherein the roughness is between 1.8 micrometers and 2.2 micrometers.

13. The abrupt interface $CO_2$ electroreduction catalyst of claim 1, wherein the catalytic layer and the gas diffusion layer are sized and configured to provide a thickness-to-roughness ratio between the thickness of the catalytic layer and the roughness of the gas diffusion layer that is between 1/500 and 1/10.

14. The abrupt interface $CO_2$ electroreduction catalyst of claim 1, wherein the catalyst layer comprises catalyst nanoparticles having particle sizes in the range of 10 nm to 100 nm.

15. An abrupt interface $CO_2$ electroreduction catalyst for converting $CO_2$ into a multi-carbon compound, comprising:
   a porous gas diffusion layer having a gas-contacting side configured for contacting a $CO_2$ gas and allowing passage of the $CO_2$ gas toward an opposed reaction interface side, the porous gas diffusion layer being composed of a hydrophobic material;
   a catalytic layer disposed on and covering the reaction interface side of the porous gas diffusion layer and having an electrolyte-contacting side configured for contacting an aqueous electrolyte, the catalytic layer being;
   hydrophilic allowing penetration of the aqueous electrolyte therethrough to form a gas-liquid interface on an opposed reaction interface side of the catalyst layer;
   composed of one or more metals selected to convert the $CO_2$ into the multi-carbon compound at determined electroreduction conditions;
   sufficiently thin to prevent diffusion limitations of the $CO_2$ in the aqueous electrolyte and provide selectivity for the multi-carbon compound; and
   wherein the catalyst layer is deposited on the porous gas diffusion layer by a physical vapor deposition technique.

16. The abrupt interface $CO_2$ electroreduction catalyst of claim 15, wherein the multi-carbon compound is ethylene and the catalytic layer is configured to provide the selectivity for the ethylene of at least 60%.

17. The abrupt interface $CO_2$ electroreduction catalyst of claim 15, wherein the catalyst layer is deposited on the porous gas diffusion layer by thermal evaporation.

18. The abrupt interface $CO_2$ electroreduction catalyst of claim 15, wherein the catalyst layer is deposited on the porous gas diffusion layer by sputtering.

19. An abrupt interface $CO_2$ electroreduction catalyst for converting $CO_2$ into a multi-carbon compound, comprising:
   a porous gas diffusion layer having a gas-contacting side configured for contacting a $CO_2$ gas and allowing passage of the $CO_2$ gas toward an opposed reaction interface side, the porous gas diffusion layer being composed of a hydrophobic material;
   a catalytic layer disposed on and covering the reaction interface side of the porous gas diffusion layer and having an electrolyte-contacting side configured for contacting an aqueous electrolyte, the catalytic layer being;
   hydrophilic allowing penetration of the aqueous electrolyte therethrough to form a gas-liquid interface on an opposed reaction interface side of the catalyst layer;
   composed of one or more metals selected to convert the $CO_2$ into the multi-carbon compound at determined electroreduction conditions;
   sufficiently thin to prevent diffusion limitations of the $CO_2$ in the aqueous electrolyte and provide selectivity for the multi-carbon compound; and
   wherein the gas diffusion layer has a pore size between 0.1 micrometer and 0.3 micrometer.

20. An abrupt interface $CO_2$ electroreduction catalyst for converting $CO_2$ into a multi-carbon compound, comprising:
- a porous gas diffusion layer having a gas-contacting side configured for contacting a $CO_2$ gas and allowing passage of the $CO_2$ gas toward an opposed reaction interface side, the porous gas diffusion layer being composed of a hydrophobic material;
- a catalytic layer disposed on and covering the reaction interface side of the porous gas diffusion layer and having an electrolyte-contacting side configured for contacting an aqueous electrolyte, the catalytic layer being:
- hydrophilic allowing penetration of the aqueous electrolyte therethrough to form a gas-liquid interface on an opposed reaction interface side of the catalyst layer;
- composed of one or more metals selected to convert the $CO_2$ into the multi-carbon compound at determined electroreduction conditions;
- sufficiently thin to prevent diffusion limitations of the $CO_2$ in the aqueous electrolyte and provide selectivity for the multi-carbon compound; and
- wherein the reaction interface side of the porous gas diffusion layer has a roughness between 1 micrometer and 3 micrometers.

\* \* \* \* \*